United States Patent
Park et al.

(10) Patent No.: US 10,659,801 B2
(45) Date of Patent: May 19, 2020

(54) METHOD AND APPARATUS FOR INTER PREDICTION IN VIDEO CODING SYSTEM

(71) Applicant: LG Electronics Inc., Seoul (KR)

(72) Inventors: Naeri Park, Seoul (KR); Jaehyun Lim, Seoul (KR); Junghak Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/087,963

(22) PCT Filed: Mar. 24, 2016

(86) PCT No.: PCT/KR2016/002961
§ 371 (c)(1),
(2) Date: Sep. 24, 2018

(87) PCT Pub. No.: WO2017/164441
PCT Pub. Date: Sep. 28, 2017

(65) Prior Publication Data
US 2019/0110061 A1    Apr. 11, 2019

(51) Int. Cl.
*H04N 21/235* (2011.01)
*H04N 19/119* (2014.01)
(Continued)

(52) U.S. Cl.
CPC ......... *H04N 19/513* (2014.11); *H04N 19/103* (2014.11); *H04N 19/119* (2014.11);
(Continued)

(58) Field of Classification Search
CPC .................... H04N 19/513; H04N 19/103
See application file for complete search history.

(56) References Cited

U.S. PATENT DOCUMENTS

| 6,275,532 B1 * | 8/2001 | Hibi | G06T 9/008 |
| | | | 375/240.17 |
| 2011/0103487 A1 * | 5/2011 | Pateux | H04N 19/46 |
| | | | 375/240.16 |

(Continued)

FOREIGN PATENT DOCUMENTS

| CN | 104539966 | 4/2015 |
| CN | 105163116 | 12/2015 |

(Continued)

OTHER PUBLICATIONS

International Search Report in International Application No. PCT/KR2016/002961, dated Dec. 1, 2016, 4 pages.

(Continued)

*Primary Examiner* — Irfan Habib
(74) *Attorney, Agent, or Firm* — Fish & Richardson P.C.

(57) ABSTRACT

A video decoding method performed by a decoding apparatus comprises: deriving control points (CPs) for the current block; obtaining motion vectors for the CPs; deriving a motion vector of a sub-block or a sample unit in the current block on the basis of the obtained motion vectors; deriving a prediction sample for the current block on the basis of the derived motion vector; and generating a reconstruction sample on the basis of the prediction sample. The method enables effective performance of inter prediction through the motion vectors (transformation prediction), not only when an image in the current block is moved in a plane, but also when the image in the current block is rotated, zoomed in, zoomed out, or transformed into a parallelogram. Accordingly, the amount of data for the residual signal for the current block can be eliminated or reduced, and the overall coding efficiency can be improved.

15 Claims, 14 Drawing Sheets

(a)

(b)

(51) Int. Cl.
*H04N 19/513* (2014.01)
*H04N 19/103* (2014.01)
*H04N 19/44* (2014.01)
*H04N 19/537* (2014.01)
*H04N 19/176* (2014.01)

(52) U.S. Cl.
CPC .......... *H04N 19/176* (2014.11); *H04N 19/44* (2014.11); *H04N 19/537* (2014.11); *H04N 21/235* (2013.01)

(56) References Cited

U.S. PATENT DOCUMENTS

| | | | |
|---|---|---|---|
| 2017/0188041 | A1 | 6/2017 | Li et al. |
| 2018/0098063 | A1* | 4/2018 | Chen ................ H04N 19/537 |
| 2018/0220149 | A1* | 8/2018 | Son ................... H04N 19/105 |
| 2018/0234697 | A1* | 8/2018 | Jang ................. H04N 19/105 |
| 2018/0278951 | A1* | 9/2018 | Seregin ............... H04N 19/70 |
| 2019/0028731 | A1* | 1/2019 | Chuang ............ H04N 19/105 |
| 2019/0058896 | A1* | 2/2019 | Huang ............... H04N 19/105 |
| 2019/0082191 | A1* | 3/2019 | Chuang ............ H04N 19/513 |
| 2019/0089960 | A1* | 3/2019 | Chen ................ H04N 19/159 |
| 2019/0104303 | A1* | 4/2019 | Xiu .................. H04N 19/105 |
| 2019/0110064 | A1* | 4/2019 | Zhang ............... H04N 19/147 |
| 2019/0149838 | A1* | 5/2019 | Zhang ................ H04N 19/54 375/240.16 |
| 2019/0208211 | A1* | 7/2019 | Zhang ............... H04N 19/109 |
| 2019/0327482 | A1* | 10/2019 | Lin ................... H04N 19/176 |

FOREIGN PATENT DOCUMENTS

| | | |
|---|---|---|
| EP | 3331242 | 6/2018 |
| JP | 09172644 | 6/1997 |
| JP | 2011146980 | 7/2011 |
| KR | 1020080088299 | 10/2008 |
| WO | WO2015099816 | 7/2015 |

OTHER PUBLICATIONS

Chen et al., "Algorithm Description of Joint Exploration Test Model 2", JVET-B1001 v1, ITU-T SG 16 WP 3 and 1S0/IEC JTC 1/SC 29/WG 11, San Diego, USA, Feb. 20-26, 2016, 31 pages.

EP Search Report in European Application No. EP16895569, dated Nov. 21, 2019, 10 pages.

Huang et al., "Control-Point Representation and Differential Coding Affine-Motion Compensation", IEEE Transactions on Circuits and Systems for Video Technology, 23(10): 1651-1660, Oct. 2013.

\* cited by examiner

FIG. 9
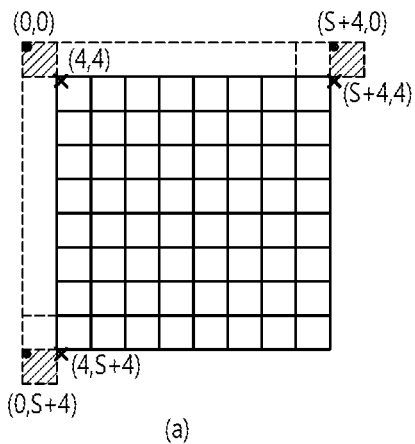
(a)
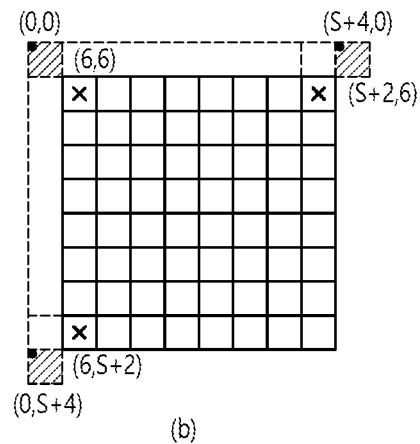
(b)
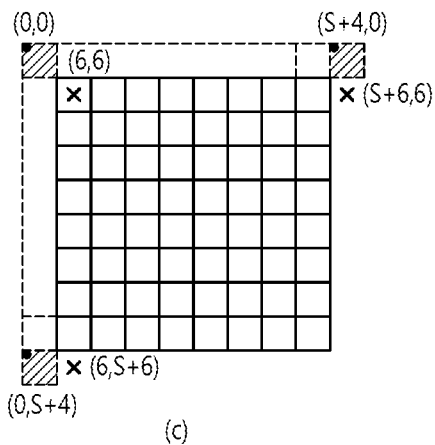
(c)
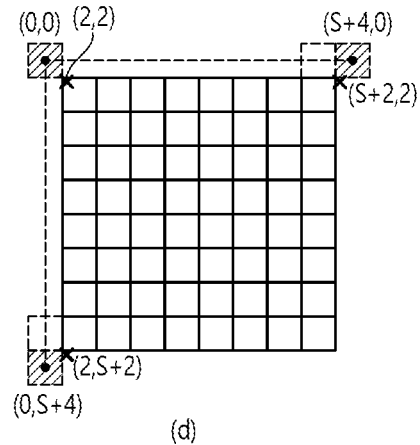
(d)
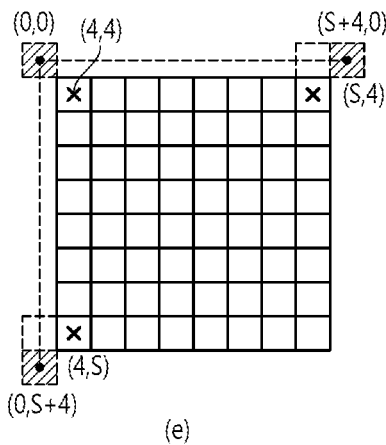
(e)
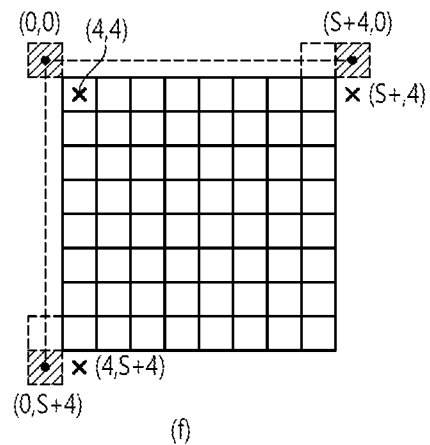
(f)

METHOD AND APPARATUS FOR INTER PREDICTION IN VIDEO CODING SYSTEM

CROSS-REFERENCE TO RELATED APPLICATIONS

This application is a National Stage application under 35 U.S.C. § 371 of International Application No. PCT/KR2016/002961, filed on Mar. 24, 2016, the contents of which are hereby incorporated by reference herein in its entirety.

BACKGROUND OF THE INVENTION

Field of the Invention

The present invention relates to a video coding technology and, more specifically, to an inter-prediction method and apparatus in a video coding system.

Related Art

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

A technical object of the present invention is to provide a method and an apparatus for improving video coding efficiency.

Another technical object of the present invention is to provide a transformation prediction model based inter-prediction method and apparatus.

A further technical object of the present invention is to provide a method and an apparatus for performing motion prediction in units of a sample or a sub-block.

Yet another technical object of the present invention is to provide a method and an apparatus for deriving a motion vector predictor or a motion vector for a control point.

Still another technical object of the present invention is to derive a motion vector for a current block based on a motion vector for a control point.

A further technical object of the present invention is to provide a method and an apparatus for deriving a motion vector for a control point based on neighboring reference blocks or neighboring reference samples.

According to an embodiment of the present invention, a video decoding method performed by a decoding apparatus is provided. The decoding method comprises: deriving control points (CPs) for a current block; acquiring motion vectors for the CPs; deriving motion vectors in units of a sub-block or a sample in the current block based on the acquired motion vectors; deriving a prediction sample for the current block based on the derived motion vectors; and generating a reconstructed sample based on the prediction sample.

According to another embodiment of the present invention, a decoding apparatus for performing video decoding is provided. The decoding apparatus comprises: a decoder configured to acquire prediction mode information about a current block from a bitstream; a predictor configured to derive control points (CPs) for the current block, to acquire motion vectors for the CPs, to derive motion vectors in units of a sub-block or a sample in the current block based on the acquired motion vectors and to derive a prediction sample for the current block based on the derived motion vectors; and an adder configured to generate a reconstructed sample based on the prediction sample.

According to another embodiment of the present invention, a video encoding method performed by an encoding apparatus is provided. The encoding method comprises: deriving control points (CPs) for a current block; acquiring motion vectors for the CPs; deriving motion vectors in units of a sub-block or a sample in the current block based on the acquired motion vectors; generating a prediction sample for the current block based on the derived motion vectors; and encoding prediction mode information about the current block and information about the derived motion vector and outputting the encoded information.

According to another embodiment of the present invention, an encoding apparatus for performing video encoding is provided. The encoding apparatus comprises: a predictor configured to determine a prediction mode for a current block; to derive control points (CPs) for the current block, to acquire motion vectors for the CPs, to derive motion vectors in units of a sub-block or a sample in the current block based on the acquired motion vectors, and to generate a prediction sample for the current block based on the derived motion vectors; and an encoder configured to encode prediction mode information about the current block and information about the derived motion vector and to output the encoded information.

According to the present invention, it is possible to derive more accurate motion vectors for a current block and to considerably improve inter-prediction efficiency.

According to the present invention, it is possible to efficiently derive motion vectors for sub-blocks or sample points of the current block based on motion vectors of control points for the current block.

According to the present invention, it is possible to effectively perform inter-prediction through motion vectors not only when an image in the current block is moved in a plane but also when the image is rotated, zoomed in, zoomed out or transformed into a parallelogram. Accordingly, the amount of data for a residual signal for the current block can be eliminated and the overall coding efficiency can be improved.

BRIEF DESCRIPTION OF THE DRAWINGS

FIG. 9 shows examples of setting reference points of a current block and neighboring blocks for coordinate extension.

DESCRIPTION OF EXEMPLARY EMBODIMENTS

Figure 1:
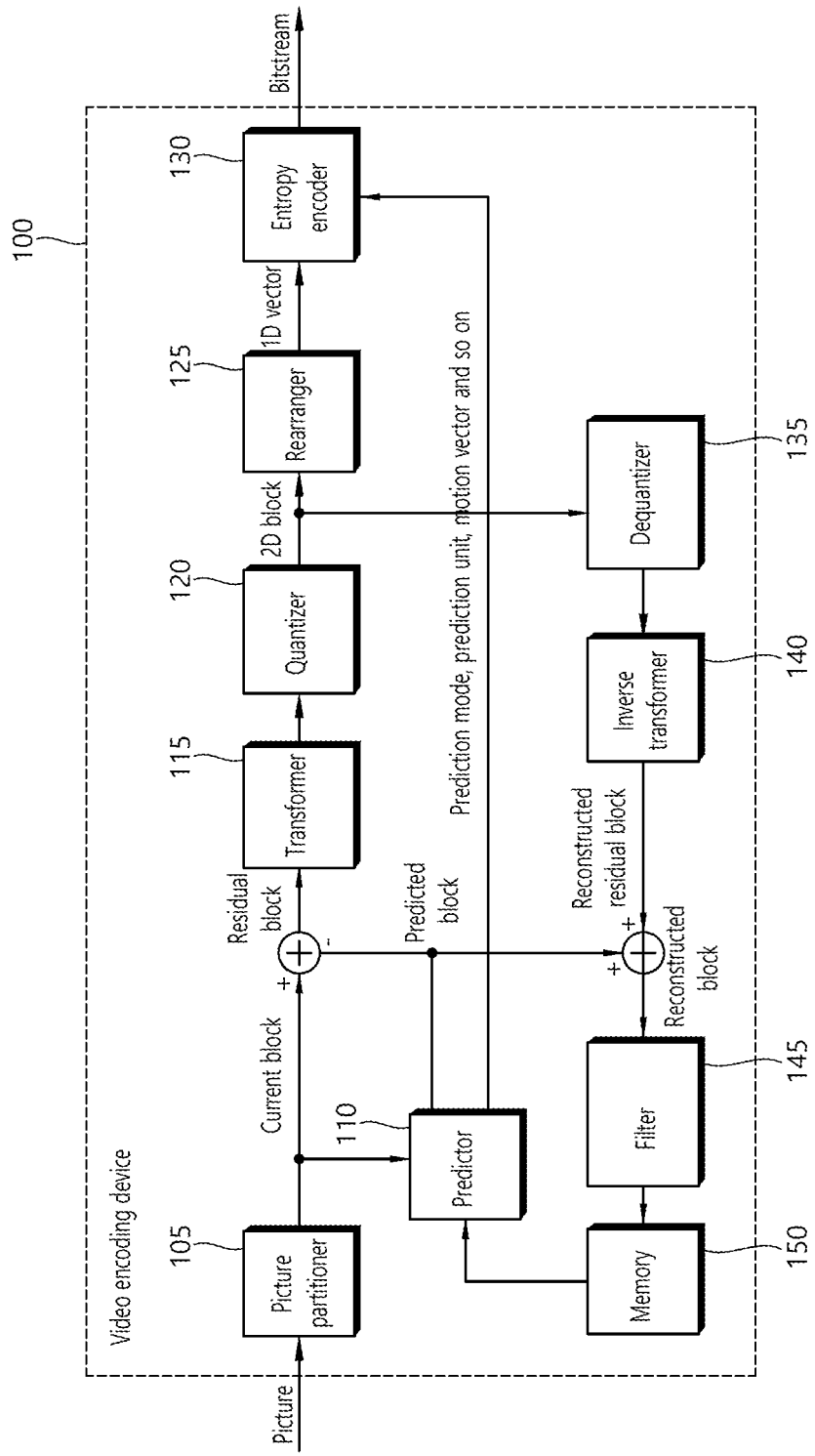
FIG. 1 is a block diagram schematically illustrating a video encoding apparatus according to an embodiment of the present invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoding device according to an embodiment of the invention.

Referring to FIG. 1, a video encoding device 100 includes a picture partitioner 105, a predictor 110, a transformer 115, a quantizer 120, a rearranger 125, an entropy encoder 130, a dequantizer 135, an inverse transformer 140, a filter 145, and memory 150.

The picture partitioner 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a deeper depth as a quad-tree structures. The PU and TU may be obtained from the CU. For example, the PU may be partitioned from a CU into a symmetric or asymmetric square structure. Also, the TU may be split into a quad tree structure from the CU. CTU may correspond to CTB (coding tree block), CU may correspond to CB (coding block), PU may correspond to PB (prediction block), and TU may correspond to TB (transform block).

The predictor 110 includes an inter-prediction unit that performs an inter-prediction process and an intra-prediction unit that performs an intra-prediction process, as will be described later. The predictor 110 performs a prediction process on the processing units of a picture divided by the picture dividing module 105 to create a prediction block including a prediction samples or a prediction samples array. In the predictor 110, the processing unit of a picture may be a CU, a TU, or a PU. The predictor 110 may determine whether the prediction performed on the corresponding processing unit is an inter-prediction or an intra-prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter-prediction, a prediction process may be performed based on information on at least one of a previous picture and/or a subsequent picture of a current picture to create a prediction block. In the intra-prediction, a prediction process may be performed based on pixel information of a current picture to create a prediction block.

As an inter-prediction method, a skip mode, a merge mode, and Advanced Motion Vector Prediction (AMVP) may be used. In inter-prediction, a reference picture may be selected for the PU and a reference block corresponding to the PU may be selected. The reference block may be selected on an integer pixel (or sample) or fractional pixel (or sample) basis. Then, a prediction block is generated in which the residual signal with respect to the PU is minimized and the motion vector magnitude is also minimized. Pixels, pels and samples are used interchangeably each other herein.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter-prediction, the motion vector difference MVD, the motion vector predictor MVP, residual signal, etc., may be entropy encoded and then transmitted to the decoding device. When the skip mode is applied, the prediction block may be used as a reconstruction block, so that the residual may not be generated, transformed, quantized, or transmitted.

When the intra-prediction is performed, the prediction mode may be determined in the unit of PU and the prediction process may be performed in the unit of PU. Alternatively, the prediction mode may be determined in the unit of PU and the inter-prediction may be performed in the unit of TU.

The prediction modes in the intra-prediction may include 33 directional prediction modes and at least two non-directional modes, as an example. The non-directional modes may include a DC prediction mode and a planar mode.

In the intra-prediction, a prediction block may be constructed after a filter is applied to a reference sample. At this time, it may be determined whether a filter should be applied to a reference sample according to the intra-prediction mode and/or the size of a current block.

Residual values (a residual block or a residual signal) between the constructed prediction block and the original block are input to the transformer 115. The prediction mode information, the motion vector information, and the like used for the prediction are encoded along with the residual values by the entropy encoder 130 and are transmitted to the decoding device.

The transformer 115 performs a transform process on the residual block in the unit of TUs and generates transform coefficients.

A transform block is a rectangular block of samples and is a block to which the same transform is applied. The transform block may be a TU and may have a quad-tree structure.

The transformer 115 may perform a transform process according to the prediction mode applied to a residual block and the size of the block.

For example, when intra-prediction is applied to a residual block and the residual block has an 4×4 array, the residual block is transformed using discrete sine transform DST. Otherwise, the residual block may be transformed using discrete cosine transform DCT.

The transformer 115 may construct a transform block of transform coefficients through the transform.

The quantizer 120 may quantize the residual values, that is, transform coefficients, transformed by the transformer 115 and may create quantization coefficients. The values calculated by the quantizer 120 may be supplied to the dequantizer 135 and the rearranger 125.

The rearranger 125 may rearrange the transform coefficients supplied from the quantizer 120. By rearranging the quantization coefficients, it is possible to enhance the encoding efficiency in the entropy encoder 130.

The rearranger 125 may rearrange the quantized transform coefficients in the form of a two-dimensional block to the form of a one-dimensional vector through the use of a coefficient scanning method.

The entropy encoder 130 may be configured to entropy code the symbol according to a probability distribution based on the quantized transform values rearranged by the rearranger 125 or the encoding parameter value calculated during the encoding process, etc. and then to output a bitstream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that can be inferred during encoding or decoding, as well as information encoded in an encoding device and passed to a decoding device like the syntax element. The encoding parameter is the information needed to encode or decode the image. The encoding parameter may include statistics or values such as for example, the intra/inter-prediction mode, movement/motion vector, reference picture index, coding block pattern, residual signal presence or absence, transform coefficient, quantized transform coefficient, quantization parameter, block size, block partitioning information, etc. Also, the residual signal may mean a difference between an original signal and a prediction signal.

Also, the difference between the original signal and the prediction signal may be transformed to define the residual signal, or the difference between the original signal and the prediction signal may be transformed and quantized to define the residual signal. The residual signal can be called the residual block in the block unit, and can be called the residual samples in the sample unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Accordingly, the compression performance of image encoding may be increased via the entropy encoding.

Encoding schemes such as exponential Golomb, Context-Adaptive Variable Length Coding (CAVLC), and Context-Adaptive Binary Arithmetic Coding (CABAC) may be used for the entropy encoding. For example, the entropy encoder 130 may store therein a table for performing entropy encoding, such as a variable length coding/code (VLC) table. The entropy encoder 130 may perform entropy encoding using the stored VLC table. Also, the entropy encoder 130 derives a binarization method of a corresponding symbol and a probability model of a corresponding symbol/bin, and then performs entropy encoding using the derived binarization method or probability model.

The entropy encoder 130 may give a predetermined change to a parameter set or syntaxes to be transmitted, when necessary.

The dequantizer 135 dequantizes the values transform coefficients quantized by the quantizer 120. The inverse transformer 140 inversely transforms the values dequantized by the dequantizer 135.

The residual value or residual samples or residual samples array generated by the dequantizer 135 and the inverse-transformer 140, and the prediction block predicted by the predictor 110 may be combined to form a reconstructed block including a reconstructed sample or a reconstructed sample array.

In FIG. 1, a residual block and a prediction block are added to create a reconstructed block by an adder. At this time, the adder may be considered as a particular unit reconstructed block creating unit that generates a reconstructed block.

The filter 145 applies a deblocking filter, an ALF Adaptive Loop Filter, an SAO Sample Adaptive Offset to the reconstructed picture.

The deblocking filter removes a block distortion generated at the boundary between blocks in the reconstructed picture. The ALF performs a filtering process based on the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

The memory 150 may store the reconstructed block or picture calculated by the filter 145. The reconstructed block or picture stored in the memory 150 may be supplied to the predictor 110 that performs the inter-prediction.

Figure 2:
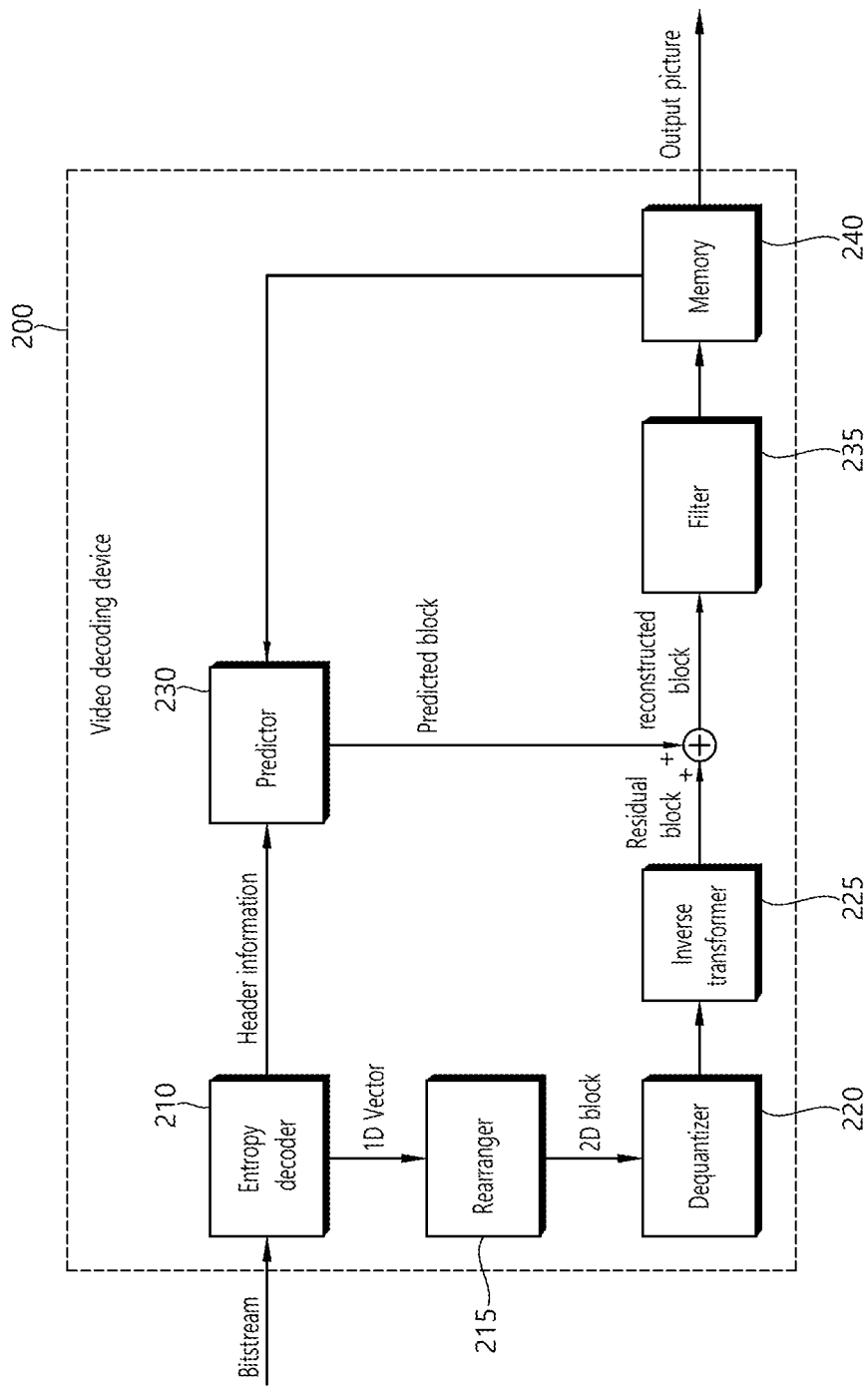
FIG. 2 is a block diagram schematically illustrating a video decoding apparatus according to an embodiment of the present invention.

FIG. 2 is a block diagram schematically illustrating a video decoding device according to an embodiment of the invention. Referring to FIG. 2, a video decoding device 200 may include an entropy decoder 210, a rearranger 215, a dequantizer 220, an inverse transformer 225, a predictor 230, a filter 235, and memory 240.

When a video bitstream is input from the video encoding device, the input bitstream may be decoded based on the order in which video information is processed by the video encoding device.

The entropy decoder 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoding device, the entropy decoder 210 may perform decoding using the same VLC table as the encoding device used in the encoding device. Also, when CABAC is used to perform entropy encoding in a video encoding device, the entropy decoder 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoder 210 may be supplied to the predictor 230, and the residual values, that is, the quantized transform coefficients, entropy-decoded by the entropy decoder 210 may be input to the rearranger 215.

The rearranger 215 may rearrange the bitstream information, that is, the quantized transform coefficients, entropy-decoded by the entropy decoder 210 based on the rearrangement method in the video encoding device.

The rearranger 215 may reconstruct and rearrange the coefficients expressed in the form of a one-dimensional vector into coefficients in the form of a two-dimensional block. The rearranger 215 may scan the coefficients based on the prediction mode applied to the current block transform block and the size of the transform block and may create an array of coefficients quantized transform coefficients in the form of a two-dimensional block.

The dequantizer 220 may perform dequantization based on the quantization parameters supplied from the video encoding device and the coefficient values of the rearranged block.

The inverse transformer 225 may perform the inverse DCT and/or inverse DST of the DCT and/or DST, which has been performed by the transformer of the video encoding device, on the quantization result from the video encoding device.

The inverse transform may be performed based on a transfer unit or a partition unit of a picture determined by the video encoding device. The transformer of the video encoding device may selectively perform the DCT and/or DST according to plural information pieces such as the prediction method, the size of a current block, and the prediction direction, and the inverse transformer 225 of the video decoding device may perform the inverse transform based on the transform information on the transform performed by the transformer of the video encoding device.

The predictor 230 generates a prediction block including prediction samples or prediction samples array based on the prediction block generation-related information provided by the entropy decoder 210 and the previously decoded block and/or picture information provided from the memory 240.

When the prediction mode for the current PU is the intra-prediction mode, the predictor 230 may perform the intra-prediction to generate a prediction block based on pixel information in the current picture.

When the prediction mode for the current PU is the inter-prediction mode, the predictor 230 may be configured to perform inter-prediction on a current PU based on information included in at least one picture of a previous picture or a subsequent picture to the current picture. In this connection, information about the motion information necessary for inter-prediction of the current PU provided in the video encoding device, such as motion vector and reference picture index may be deduced via checking the skip flag and merge flag received from the encoding device.

The predictor 230 may generate a prediction block such that the residual signal relative to the current block is minimized and the motion vector size is minimized when inter-prediction is performed on the current picture.

On the other hand, the motion information derivation method may be changed according to the prediction mode of the current block. The prediction mode applied to inter-prediction may include an Advanced Motion Vector Prediction (AMVP) mode, a merge mode, and the like.

For example, when a merge mode is applied, the encoding device and the decoding device may generate a merge candidate list using the motion vector of the reconstructed spatial neighboring block and/or the motion vector corresponding to the Col block which is a temporally neighboring block. In the merge mode, the motion vector of the candidate block selected in the merge candidate list is used as the motion vector of the current block. The encoding device may transmit a merge index indicating a candidate block having an optimal motion vector selected from the candidate blocks included in the merge candidate list to the decoding device. In this case, the decoding device may derive the motion vector of the current block using the merge index.

In another example, when the AMVP (Advanced Motion Vector Prediction) mode is applied, the encoding device and decoding device generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoding device may transmit to the decoding device a prediction motion vector index indicating the optimal motion vector selected from among the motion vector candidates included in the motion vector predictor candidate list. In this connection, the decoding device may select the prediction motion vector for the current block from the motion vector candidates included in the motion vector candidate list using the motion vector index.

The encoding device may obtain the motion vector difference MVD between the motion vector for the current block and the motion vector predictor (MVP), encode the MVD, and transmit the encoded MVD to the decoding device. That is, the MVD may be a value obtained by subtracting the motion vector predictor (MVP) from the motion vector (MV) for the current block. In this connection, the decoding device may decode the received motion vector difference, and derive the motion vector for the current block via addition between the decoded motion vector difference and the motion vector predictor.

Also, the encoding device may transmit a reference picture index indicating a reference picture to the decoding device.

The predictor 230 of the decoding device may predict the motion vector of the current block using the motion information of the neighboring block and derive the motion vector of the current block using the residual received from the encoding device. The decoding device may generate prediction sample (or prediction sample array) for the current block based on the derived motion vector and the reference picture index information received from the encoding device.

The decoding device may generate a reconstructed sample (or reconstructed sample array) by adding a prediction sample (or prediction sample array) to a residual sample (residual sample array) acquired from transform coefficients transmitted from the encoding device. Based on the reconstructed sample, a reconstructed block and a reconstructed picture may be generated.

In the above-described AMVP and merge modes, motion information of the reconstructed neighboring block and/or motion information of the Col block may be used to derive motion information of the current block.

In the skip mode, which is one of the other modes used for inter-prediction, neighboring block information may be used for the current block as it is. Accordingly, in the case of skip mode, the encoder does not transmit syntax information such as the residual to the decoding device in addition to information indicating which block's motion information to use as the motion information for the current block.

The reconstructed block may be generated using the predicted block generated by the predictor 230 and the residual block provided by the inverse-transformer 225. FIG. 2 illustrates that using the adder, the predicted block and the residual block are combined to generate the reconstructed block. In this connection, the adder may be viewed as a separate element (a reconstructed block generator) that is configured to generate the reconstructed block. In this connection, the reconstructed block includes reconstructed samples or a reconstructed samples array as described above; the predicted block includes a prediction samples or a prediction samples array; the residual block may include a residual samples or a residual samples array. Accordingly, the reconstructed samples or the reconstructed samples array can be considered to be generated by combining the corresponding prediction samples or prediction samples array with the corresponding residual samples or residual samples array.

When the skip mode is used for a block, the residual signal may not be transmitted and the predicted block may be used as a reconstructed block.

The reconstructed block and/or picture may be supplied to the filter 235. The filter 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output unit.

The elements that is directly related to decoding images among the entropy decoder 210, the rearranger 215, the dequantizer 220, the inverse transformer 225, the predictor 230, the filter 235 and the memory 240 which are included in the decoding device 200, for example, the entropy decoder 210, the rearranger 215, the dequantizer 220, the inverse transformer 225, the predictor 230, the filter 235, and so on may be expressed as a decoder or a decoding module that is distinguished from other elements.

In addition, the decoding device 200 may further include a parser not shown in the drawing that parses information related to the encoded images included in a bitstream. The parser may include the entropy decoder 210, and may be included in the entropy decoder 210. Such a parser may also be implemented as an element of the decoding module.

Inter-prediction for the current block may be performed in consideration of a target object or motion of an image between pictures. However, a conventional inter-prediction method uses only one motion vector in units of a prediction block (PB). In this case, high prediction performance can be obtained when an image (part thereof) is moved in a plane with the lapse of time but prediction performance is deteriorated when the image is transformed such as being rotated, zoomed in or zoomed out. Hereinafter, image distortion may include the aforementioned image transformation such as rotation, zoom-in and zoom-out.

The present invention provides an inter-prediction method in consideration of such image distortion. According to the present invention, it is possible to efficiently derive motion vectors for sub-blocks or sample points of the current block and to improve inter-prediction accuracy in spite of transformation such as rotation, zoom-in or zoom-out of an image. Prediction model according to the present invention may be referred to as a transformation prediction model. According to the present invention, transformation of the current block into a parallelogram, for example, may be predicted. That is, according to the present invention, inter-prediction can be efficiently performed through motion prediction even when an image in the current block is transformed into a parallelogram in a reference picture. In a motion prediction method according to the present invention, a distortion form of the image may be predicted based on motion vectors at control points (CPs) of the current block and inter-prediction accuracy may be increased to improve image compression performance. Furthermore, according to the present invention, a motion vector for at least one control point of the current block can be derived using motion vectors of neighboring blocks, the amount of data with respect to added additional information can be reduced and inter-prediction efficiency can be considerably improved.

The prediction method according to the present invention requires motion information at three control points, that is, three reference points, for example.

Figure 3:
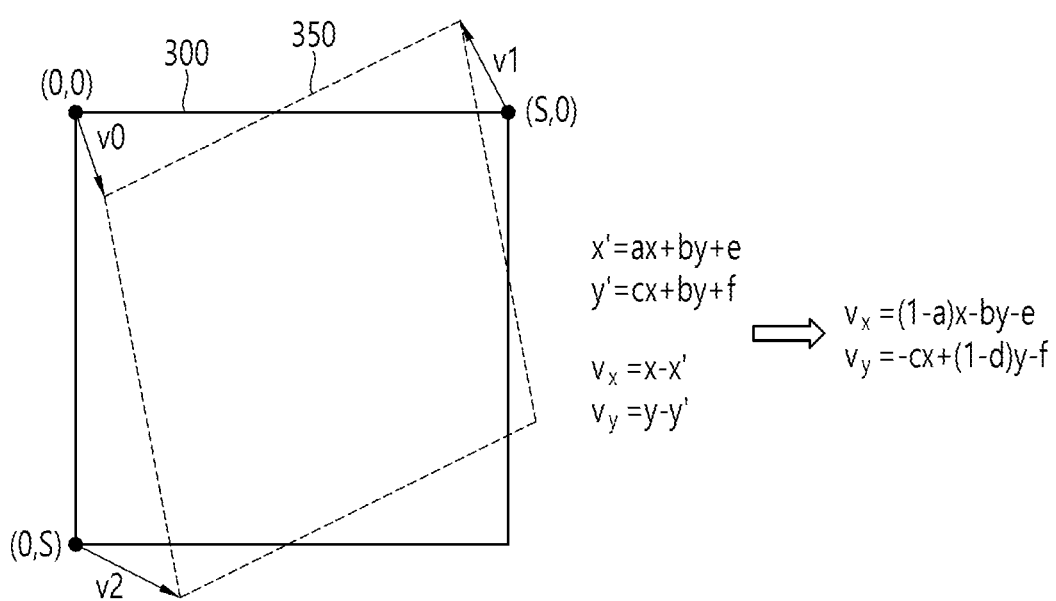
FIG. 3 illustrates a transformation prediction model.

FIG. 3 illustrates a transformation prediction model. Although it is assumed that the height and the width of a current block 300 are identical as S in FIG. 3, this is an example and the height may differ from the width. Here, the current block 300 may include a prediction block PB. The prediction block may be a block derived from a coding block through a partitioning procedure, and a specific inter-prediction mode such as whether the transformation prediction model (or transformation prediction mode) is applied may be determined in units of the prediction block. For example, whether inter-prediction is applied or intra-prediction is applied is determined in units of the coding block. When inter-prediction is applied to the coding block including the prediction block, whether a specific inter-prediction mode is applied to the prediction block may be determined.

Referring to FIG. 3, x and y represent x and y coordinates of each sample in the current block 300, and x' and y' represent x and y coordinates of a corresponding sample in a reference picture corresponding to x and y. In this case, a region including samples of a sample position indicated by (x', y') may be referred to as a reference block 350 or a reference region 350. In this case, the reference block 350 may correspond to a region including an image transformed from an image in the current block 300 according to transformation such as rotation, zoom-in or zoom-out. Accordingly, the size and shape of the reference block 350 may differ from those of the current block 300.

When a top-left sample position in the current block 300 is (0, 0), x and y may be determined based on the top-left sample position (0, 0). In addition, x' and y' may be determined based on coordinates of a position in the reference picture, which is identical or corresponding to the top-left sample position of the current block 300.

As shown in FIG. 3, x' and y' may be represented as x'=ax+by+e and y'=cx+dy+f. Further, vx=x−x' and $v_y$=y−y'. A transformation prediction model formula may be represented by vx=(1−a)x−by−e and vy=−cx+(1−d)y−f by arranging the aforementioned equations. Here, vx represents an x-component of a motion vector of a (x, y) coordinate sample in the current block 300 and $v_y$ represents a y-component of the motion vector of the (x, y) coordinate sample in the current block 300. That is, ($v_x$, $v_y$) represents the motion vector of the (x, y) coordinate sample. Therefore, according to the transformation prediction model, different motion vectors may be obtained according to sample coordinates in the current block.

To apply the transformation prediction model, control points need to be defined. For example, sample positions (0, 0), (S, 0) and (0, S) as shown in FIG. 3 may be determined as control points. Hereinafter, a control point of the sample position (0, 0) may be referred to as CP0, a control point of the sample position (S, 0) may be referred to as CP1 and a control point of the sample position (0, S) may be referred to as CP2. Although it is assumed that the height and the width of the current block 30 are identical in this example, the control points can have coordinates (0, 0), (W, 0) and (0, H) if the height of the current block 300 is H and the width thereof is W, and W or H can replace S in equations described below.

The aforementioned transformation prediction mode formula can be solved using the above-described control points and motion vectors for the control points. Here, parameters a, b, c, d, e and f of the transformation prediction model formula may be solved as follows.

$$a = 1 - \frac{v_{x1} - v_{x0}}{S}, b = -\frac{v_{x2} - v_{x0}}{S}, e = -v_{x0}$$
$$c = -\frac{v_{y1} - v_{y0}}{S}, d = 1 - \frac{v_{y2} - v_{y0}}{S}, f = -v_{y0}$$

[Equation 1]

Here, $v_{x0}$ and $v_{y0}$ represent an x-component and a y-component of the motion vector of CP0, $v_{x1}$ and $v_{y1}$ represent an x-component and a y-component of the motion vector of CP1 and $v_{x2}$ and $v_{y2}$ represent an x-component and a y-component of the motion vector of CP2.

The transformation prediction model formula may be arranged as follows based on the parameters of Equation 1.

$$v_x = \frac{v_{x1} - v_{x0}}{S}x + \frac{v_{x2} - v_{x0}}{S}y + v_{x0}$$

[Equation 2]

-continued
$$v_y = \frac{v_{y1} - v_{y0}}{S}x + \frac{v_{y2} - v_{y0}}{S}y + v_{y0}$$

Here, motion vectors according to sample positions in the current block can be derived according to Equation 2 because the motion vector of CP0, the motion vector of CP1 and the motion vector of CP2 are known. That is, according to the transformation prediction model, motion vectors v0($v_{x0}$, $v_{y0}$), v1($v_{x1}$, $v_{y1}$) and v2($v_{x2}$, $v_{y2}$) at the control points can be scaled based on distance ratios of coordinates (x, y) of a target sample the three control points to derive a motion vector at the sample position.

Figure 4:
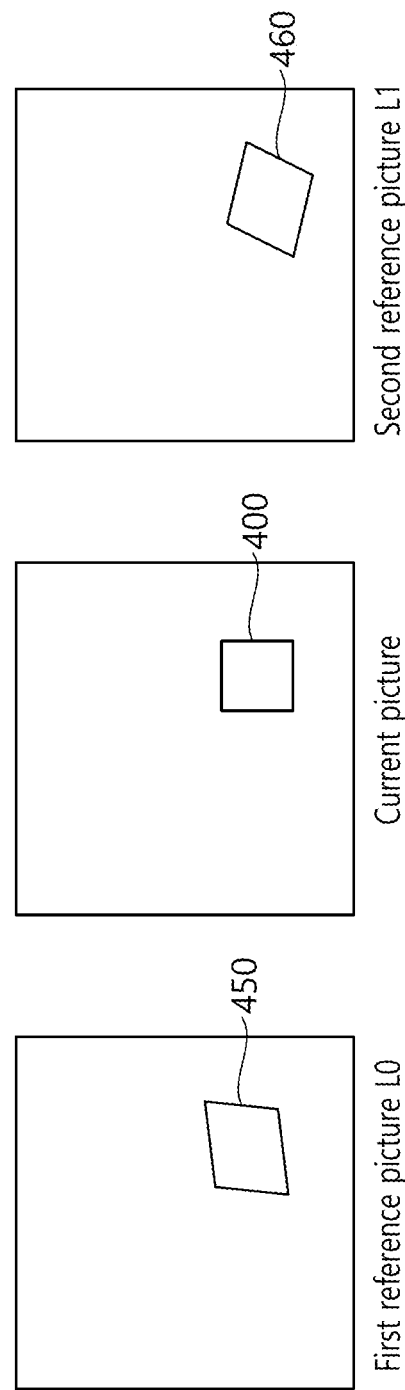
FIG. 4 illustrates prediction directions and reference regions according to the transformation prediction model.

FIG. 4 illustrates prediction directions and reference regions according to the transformation prediction model.

Referring to FIG. 4, when prediction according to the transformation prediction model is performed on a current block 400 in a current picture, a reference region 450 or 460 may be positioned as shown.

For prediction for the current block, one or two reference picture lists may be used. That is, reference picture list 0 or reference picture list 1 may be used or both reference picture lists 0 and 1 may be configured for prediction for the current block. For example, at least one of the aforementioned two reference pictures may be used when a slice type of a slice in which the current block is included is B (B slice) and only reference picture list 0 may be used when the slice type of the slice in which the current block is included is P (P slice). Reference picture list 0 may be referred to as L0 and reference picture list 1 may be referred to as L1. In execution of prediction for the current block, inter-prediction based on L0 may be referred to as L0 prediction, inter-prediction based on L1 may be referred to as L1 prediction, and inter-prediction based on L0 and L1 (i.e., combination of L0 prediction and L1 prediction) may be referred to as BI-prediction. In this case, separate motion vectors may be used for L0 prediction and L1 prediction. That is, when motion vectors are derived in units of a sample or a sub-lock which will be described later according to the transformation prediction model, separate motion vectors may be derived in units of the sample or sub-block according to whether L0 prediction and/or L1 prediction is applied. For example, a motion vector MVL0 for L0 prediction and a motion vector MVL1 for L1 prediction for a first sample or a first sub-block in the current block may be separately derived.

For example, when a first reference picture is a decoded picture included in L0, the slice type of the slice in which the current block 400 is included is P or B, and L0 is used in FIG. 4, the first reference picture may be used for prediction of the current block 400 according to the present invention. In this case, the reference region 450 in the first reference picture may be derived based on motion vectors for the current block 400, which are derived according to the above-described transformation prediction model, and prediction samples of the current block 400 may be derived based on reconstructed samples in the reference region 450.

On the other hand, when the first reference picture is a decoded picture included in L0, a second reference picture is a decoded picture included in L1, the slice type of the slice in which the current block 400 is included is B, and both L0 and L1 (i.e., BI) are used in FIG. 4, the first reference picture and the second reference picture may be used for prediction of the current block 400 according to the present invention. In this case, the reference region 450 in the first reference picture may be derived based on motion vectors for L0 prediction for the current block 400, which are derived according to the aforementioned transformation prediction model, and the reference region 460 in the second reference picture may be derived based on motion vectors for L1 prediction. In this case, prediction samples of the current block 400 may be derived based on reconstructed samples in the reference region 450 and reconstructed samples in the reference region 460. For example, the prediction samples of the current block 400 may be derived through the weighted sum of the reconstructed samples in the reference region 450 and the reconstructed samples in the reference region 460. Here, the weighted sum may be obtained based on a first time distance between the current picture and the first reference picture and a second time distance between the current picture and the second reference picture. Here, a time distance may represent a picture order count (POC) difference. That is, a difference between a POC value of the current picture and a POC value of the first reference picture may be the first time distance and a difference between the POC value of the current picture and a POC value of the second reference picture may be the second time distance.

One of L0 prediction and L1 prediction is applied in the following description in order to avoid redundant description. Based on this, motion vectors for L0 prediction and motion vectors for L1 prediction may be individually derived and Bi prediction may be performed.

According to the above-described transformation prediction model, motion vectors in units of a pixel (i.e., in units of a sample) can be derived and inter-prediction accuracy can be considerably improved. However, when the transformation prediction model is used, complexity in motion compensation may remarkably increase. In addition, a motion vector for each control point is required and thus three pieces of motion information per prediction block need to be provided (i.e., signaled). Further, there are lots of data to be encoded compared to conventional motion prediction methods in which one piece of motion information is provided per prediction block, in general. To solve this problem, the present invention may provide the following method.

For example, to reduce complexity in motion compensation due to motion vector derivation in units of a pixel, motion vectors may be derived in units of a sub-block in a prediction block. The sub-block may be set to various sizes. For example, when the sub-block is set to an n×n size (n is a positive integer, e.g., n is 4), (transformation prediction) motion vectors may be derived in units of an n×n sub-block in the current block and various methods for deriving a motion vector which represents each sub-block may be applied.

Figure 5:
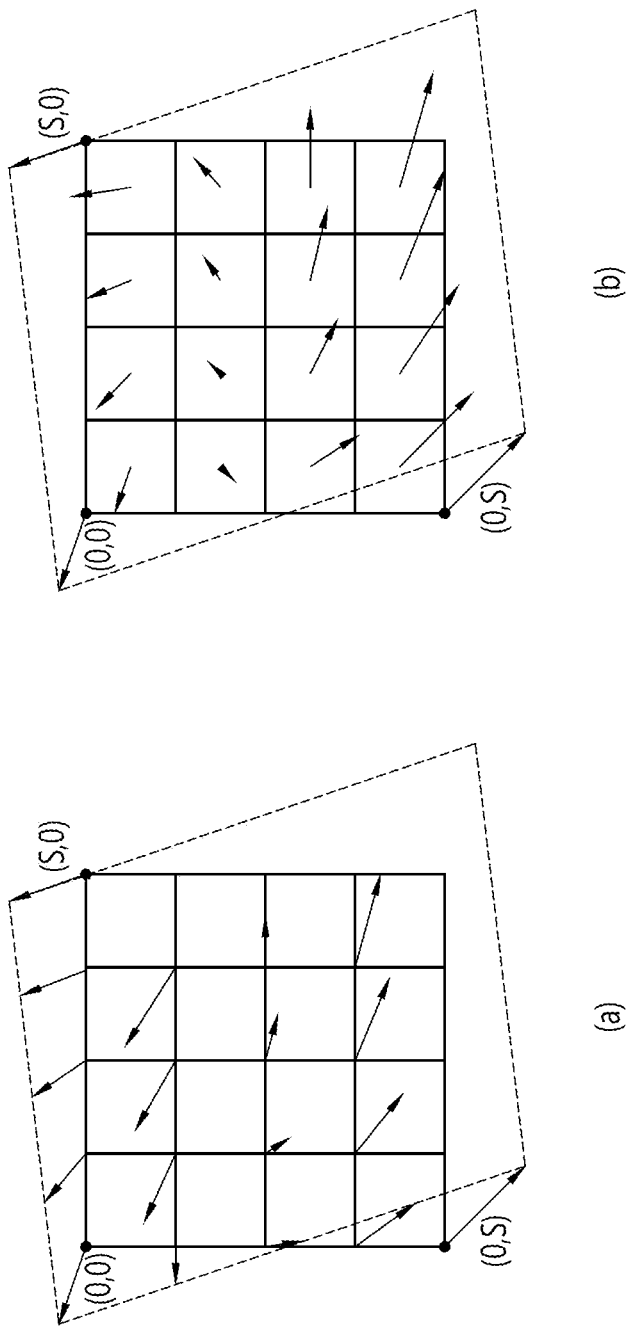
FIG. 5 schematically shows a method of deriving motion vectors in units of a sub-block.

FIG. 5 schematically shows a method of deriving a motion vector in units of a sub-block. FIG. 5 illustrates cases in which the current block has a size of 16×16 and motion vectors are derived in units of a 4×4 sub-block.

Referring to FIG. 5, the current block may be divided into a plurality of 4×4 sub-blocks. A representative motion vector may be set per sub-block. In this case, a motion vector at representative coordinates (i.e., a representative sample position) of each sub-block may be the representative motion vector.

(a) of FIG. 5 shows a case in which motion vectors are derived using the top-left sample position of each sub-block as representative coordinates. In this case, a representative motion vector of each sub-block may be derived by putting representative coordinates (0, 0), (4, 0), (8, 0), . . . , (12, 12) of sub-blocks in the aforementioned equation 2.

Further, (b) of FIG. 5 shows a case in which motion vectors are derived using the center or center lower right side sample position of each sub-block as representative coordinates. Here, a center lower right side position refers to a position of a sample disposed at a lower right side among four samples positioned at the center of a sub-block. For example, when n is an odd number, one sample is positioned at the center of a sub-block and, in this case, a center sample position may be used. However, when n is an even number, 4 samples are contiguous at the center of a sub-block. In this case, a lower right side sample position may be used. In the case of (b) of FIG. 4, a representative motion vector of each sub-block may be derived by putting representative coordinates (2, 2), (6, 2), (10, 2), . . . , (14, 14) of sub-blocks in the aforementioned equation 2.

Furthermore, to reduce the amount of data to be encoded with respect to motion information about three control points per prediction block, the number of control points may be limited to 2, for example. That is, it is possible to signal motion information about the two control points instead of signaling motion information about the three control points. The transformation prediction model may represent transformation in the form of rotation, zoom-in and zoom-out and transformation into a parallelogram and, when two control points on a straight line are valid, the transformation prediction model can represent at least transformation in the form of rotation, zoom-in and zoom-out. Accordingly, motion prediction may be performed using motion vectors of the two control points and motion vectors for the current block may be derived according to circumstances in order to reduce the amount of data regarding motion information. In this case, motion vectors for CP0 and CP1 may be explicitly signaled or information for deriving the aforementioned motion vectors may be signaled and a motion vector for CP2 may be calculated based on the signaled motion vectors or information, for example.

Figure 6:
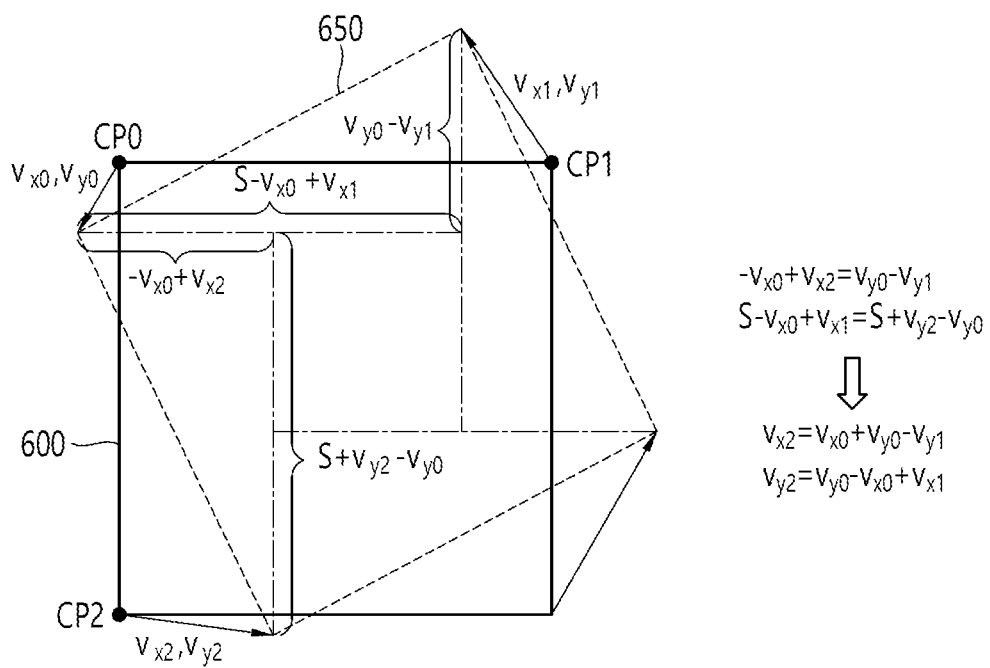
FIG. 6 illustrates a method of deriving a motion vector for one control point based on two control points.

FIG. 6 illustrates a method of deriving a motion vector for the remaining one control point based on the two control points.

Referring to FIG. 6, when CP0 and CP1 on a straight line are present as two control points for a current block 600, a motion vector v2 ($v_{x2}$, $v_{y2}$) for CP2 positioned at a lower left sample position of the current block 600 may be derived based on motion vectors for CP0 and CP1. When a motion vector v0 for CP0 is ($v_{x0}$, $v_{y0}$), a motion vector v1 for CP1 is ($x_{v1}$, $v_{y1}$), and the height and width of the current block are identical as S, $-v_{x0}+v_{x2}=v_{y0}-v_{y1}$ and $S-v_{x0}+v_{x1}=S+v_{y2}-v_{y0}$ as shown in FIG. 6. The aforementioned equations are arranged as $v_{x2}=v_{x0}+v_{y0}-v_{y1}$ and $v_{y2}=v_{y0}-v_{x0}+v_{x1}$.

Accordingly, in this case, a transformation prediction model formula derived based on the two control points CP0 and CP1 may be represented as follows.

$$v_x = \frac{v_{x1} - v_{x0}}{S}x - \frac{v_{y1} - v_{y0}}{S}y + v_{x0} \quad \text{[Equation 3]}$$
$$v_y = \frac{v_{y1} - v_{y0}}{S}x + \frac{v_{y1} - v_{y0}}{S}y + v_{y0}$$

The transformation prediction model may be applied using motion vectors at two control points through the above-described method, and a reference region 650 may be detected based on the derived motion vectors and prediction accuracy may be improved through the transformation prediction model.

Meanwhile, motion vectors for control points may be derived based on neighboring blocks (or neighboring sub-blocks or neighboring samples). For example, when a merge mode or a skip mode is applied, a motion vector of a neighboring block (or neighboring sub-block or a neighboring sample) may be directly derived as a motion vector of a control point through scaling or a predefined transformation. When an advanced motion vector prediction (AMVP) mode is applied, as another example, a motion vector of a control point may be derived by deriving a motion vector predictor (MVP) of the control point based on motion vectors of neighboring blocks (or neighboring sub-blocks or neighboring samples) and adding an additionally signaled motion vector difference to the MVP.

Specifically, when the merge mode or a skip mode is applied to the current block, for example, motion vectors of neighboring blocks may be used as motion vectors of control points in order to apply the transformation prediction model. In a normal image, since motion similarity between a current block and a neighboring block is high, a motion vector at a control point of the current block may be derived using the motion vector of the neighboring block when the transformation prediction model is also applied to the neighboring block.

Figure 7:
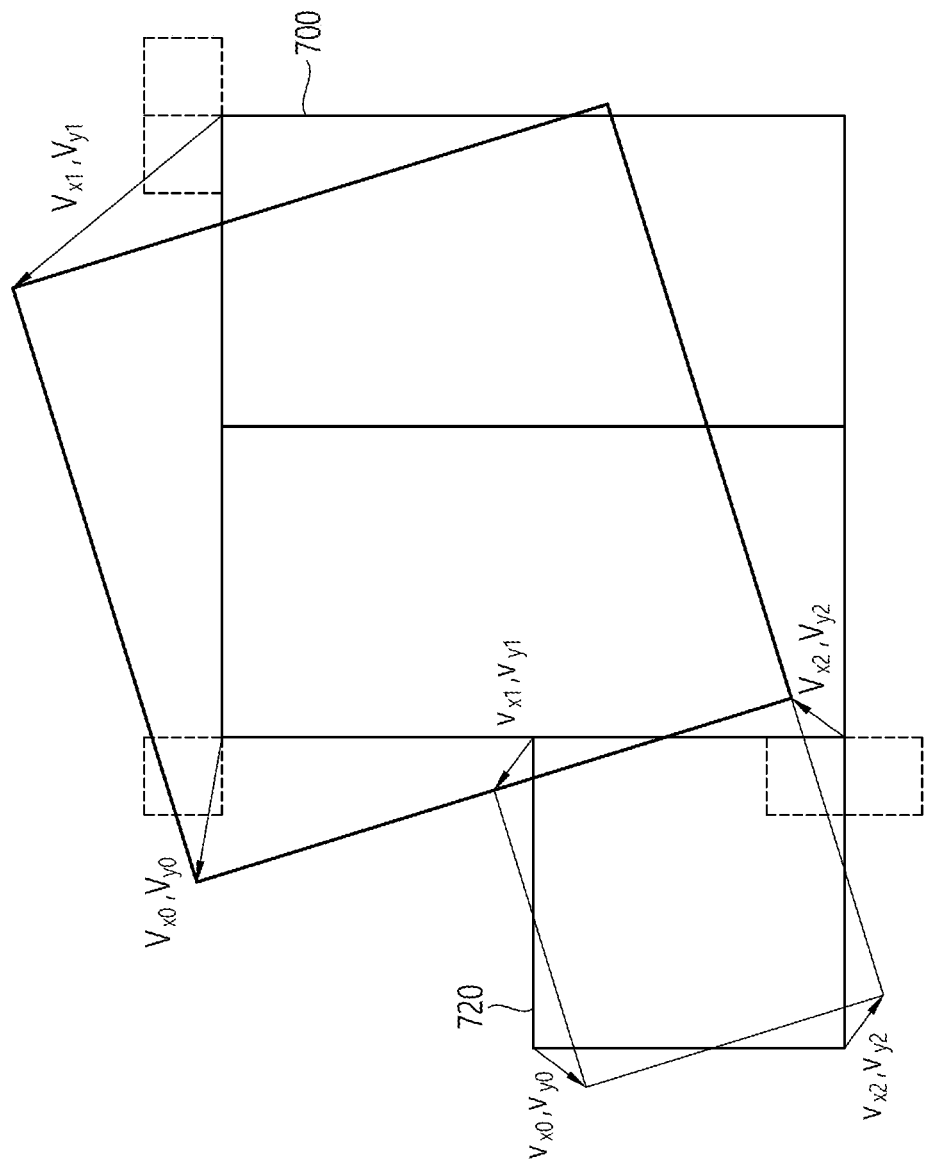
FIG. 7 schematically shows an example of deriving a motion vector at a control point from motion vectors of neighboring blocks.

FIG. 7 schematically shows an example of deriving a motion vector at a control point from a motion vector of a neighboring block.

Referring to FIG. 7, it is assumed that the transformation prediction model is applied to a left neighboring block 720 of a current block 700, a motion vector of a control point cp0 of the left neighboring block 720 is $v0(v_{x0}, v_{y0})$, a motion vector of a control point cp1 is $v1(v_{x1}, v_{y1})$, and a motion vector of a control point cp2 is $v2(v_{x2}, v_{y2})$. Here, if only information about motion vectors for two control points is signaled, as described above, v2 may be a motion vector derived using v0 and v1 as represented by relations of FIG. 5.

When a motion vector of a control point CP0 of the current block 700 is $V0(V_{x0}, V_{y0})$ and a motion vector of a control point CP2 is $V2(V_{x2}, V_{y2})$, the motion vector of the left neighboring block 720 may be scaled at a size ratio of the current block 700 to the left neighboring block 720 to derive V0, V1 and V2. Further, when it is assumed that the left neighboring block 720 is an s×s size block, sample coordinates (s, s) derived using the top-left sample position of the left neighboring block 720 as a base (0, 0) may be the same as sample coordinates (0, S) derived using the top-left sample position of the current block 700 as a base (0, 0) on the assumption that the current block 700 is an S×S size block. Accordingly, a motion vector of the sample coordinates (s, s) of the left neighboring block 720, derived according to the transformation prediction model formula, may be used as a motion vector of CP2 of the current block 700. If the left neighboring block 720 is a w×h size block and the current block 700 is a W×H size block, a motion vector of sample coordinates (w, h) of the left neighboring block 720, derived according to the transformation prediction model formula, may be used as a motion vector of CP2 of the current block 700.

When the motion vector of the current block is derived and used based on a motion vector of a neighboring block to which the transformation prediction model has been applied, as described in the above embodiment, the motion vector of the current block is affected only by transformation of the one neighboring block. Further, when two control points are used as described above, the amount of data regarding motion information which needs to be transmitted can be reduced. However, effects of the transformation prediction model may significantly deteriorate when a motion vector of a neighboring block varies in various manners because the transformation prediction model is limited to transformation of rotation, zoom-in and zoom-out. Particularly, in the case of the merge mode or the skip mode, MVP signaling for motion vectors is not required and thus it is efficient to use three available control points for inter-prediction of an image having lots of transformations.

Accordingly, for more efficient inter-prediction, motion vectors for control points of the current block may be derived based on a plurality of neighboring blocks.

Figure 8:
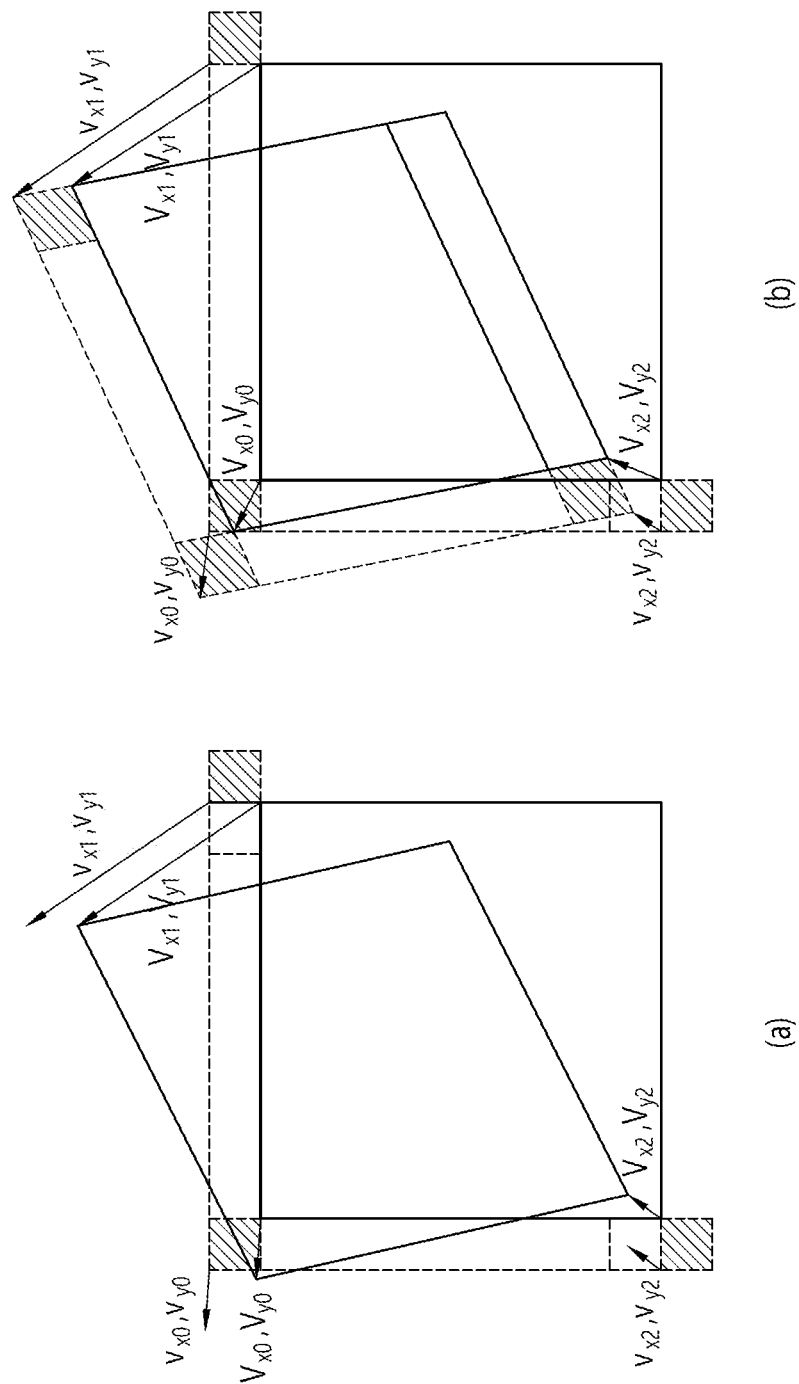
FIG. 8 illustrates a method of deriving motion vectors for control points of a current block based on motion vectors of a plurality of neighboring blocks.

FIG. 8 illustrates a method of deriving motion vectors for control points of the current block based on motion vectors of a plurality of neighboring blocks.

Referring to FIG. 8, motion vectors for control points of the current block may be derived based on motion vectors of neighboring blocks (or neighboring sub-blocks) adjacent to the control points of the current block. A block may include a sub-block in the present embodiment.

(a) of FIG. 8 shows an example of reusing a motion vector of a neighboring block as a motion vector at a control point of the current block. A upper left neighboring block may be determined as a candidate for deriving a motion vector V0 of CP0 at a sample position (0, 0) of the current block, an upper right neighboring block may be determined as a candidate for deriving a motion vector V1 of CP1 at a sample position (S, 0), and a lower left neighboring block may be determined as a candidate for deriving a motion vector V2 of CP2 at a sample position (0, 2). Here, when the corresponding neighboring blocks are unavailable or have not been coded in the inter mode, other blocks adjacent to the corresponding neighboring blocks may be used as candidate blocks. Cases in which neighboring blocks are unavailable will be described later.

A motion vector of an available candidate block may be used as a motion vector of a control point corresponding thereto. For example, a motion vector of an upper left neighboring block or a representative motion vector of a upper left neighboring sub-block may be used as V0 of CP0, a motion vector of an upper right neighboring block or a representative motion vector of a upper right neighboring sub-block may be used as V1 of CP1, and a motion vector of a lower left neighboring block or a representative motion vector of a lower left neighboring sub-block may be used as V2 of CP2.

Further, (b) of FIG. 8 shows an example of extending coordinates based on neighboring blocks adjacent to the current block and deriving a motion vector according to coordinates at each control point using motion vectors of the neighboring blocks. That is, coordinates including the neighboring blocks are reconfigured and motion vectors with respect to the reconfigured coordinates may be derived using the aforementioned equation 2. Here, when only two control points on a straight line are available, that is, when neighboring blocks of CP0 and CP1 or CP1 and CP2 are valid, motion vectors with respect to coordinates reconfigured based on the aforementioned equation 3 may be derived.

FIG. 9 shows an example of setting reference points of a current block and neighboring blocks for coordinate extension.

Referring to FIG. 9, derived motion vectors may vary according to setting of coordinates of neighboring blocks adjacent to the current block and coordinates of control points of the current block. For example, a reference point (0, 0) may be set to a top-left sample position of an upper left neighboring block (sub-block) or to a center or center lower right side sample position. In this case, coordinates of each sample and sub-block in the current block vary according to the reference point and coordinates of control points also vary. In this case, a motion vector at each coordinates in the current block may be obtained using changed coordinates based on Equation 2 or 3. Here, a motion vector for each control point in the current block may be obtained and then the transformation prediction model formula may be re-derived based on the motion vector, or motion vectors in units of a sample or a sub-block in the current block may be directly obtained based on changed coordinates.

Specifically, referring to (a), when the block size is increased such that the block includes neighboring candidate blocks adjacent to each control point, for example, coordinates for the neighboring candidate blocks according to extended coordinates may be (0, 0), (S+4, 0) and (0, S+4). Here, when it is assumed that a motion vector for each neighboring candidate block is present having the corresponding coordinates as representative coordinates, a motion vector for each control point of the current block may be arranged as follows based on the aforementioned equation 2.

$$V_{x0} = \frac{v_{x1} - v_{x0}}{S+4}4 + \frac{v_{x2} - v_{x0}}{S+4}4 + v_{x0}$$ [Equation 4]

$$V_{y0} = \frac{v_{y1} - v_{y0}}{S+4}4 + \frac{v_{y2} - v_{y0}}{S+4}4 + v_{y0}$$

$$V_{x1} = \frac{v_{x1} - v_{x0}}{S+4}(S+4) + \frac{v_{x2} - v_{x0}}{S+4}4 + v_{x0}$$

$$V_{y1} = \frac{v_{y1} - v_{y0}}{S+4}(S+4) + \frac{v_{y2} - v_{y0}}{S+4}4 + v_{y0}$$

$$V_{x2} = \frac{v_{x1} - v_{x0}}{S+4}4 + \frac{v_{x2} - v_{x0}}{S+4}(S+4) + v_{x0}$$

$$V_{y2} = \frac{v_{y1} - v_{y0}}{S+4}4 + \frac{v_{y2} - v_{y0}}{S+4}(S+4) + v_{y0}$$

In the cases of (b) to (f), a motion vector at each control point may be derived based on changed coordinates through the same method or motion vectors in units of a sample or a sub-block in the current block may be directly obtained based on changed coordinates.

Meanwhile, a plurality of neighboring blocks per control point of the current block may be present as candidate blocks. In this case, availability check may be performed according to priority of candidate blocks.

Figure 10:
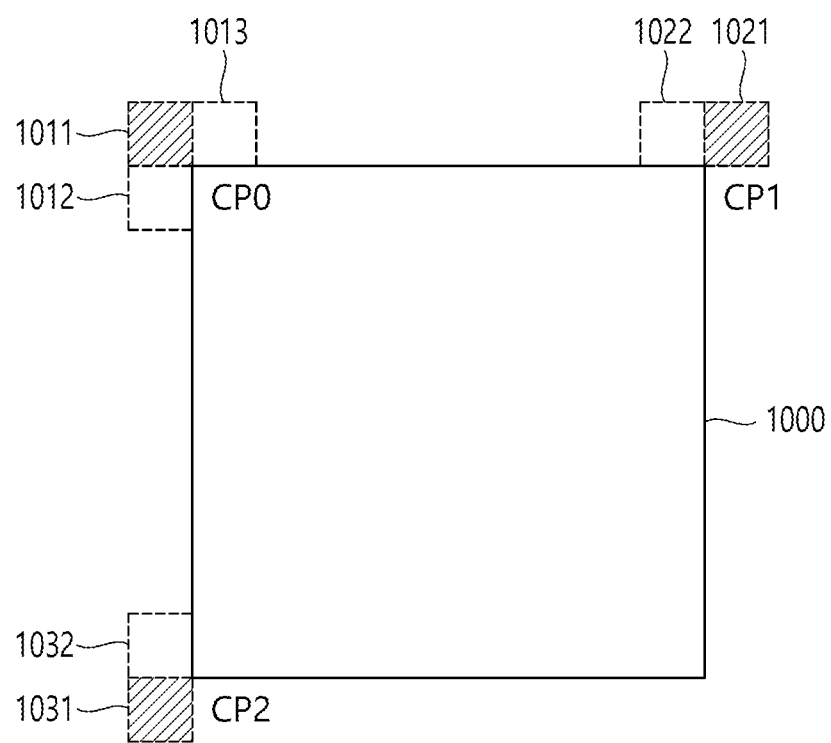
FIG. 10 illustrates neighboring blocks for each control point of a current block.

FIG. 10 illustrates neighboring blocks with respect to each control point of a current block.

Referring to FIG. 10, neighboring candidate blocks with respect to CP0 of a current block 1000 may include an upper left neighboring block 1011, a left neighboring block 1012 and an upper neighboring block 1013 of the current block 1000. Here, the left neighboring block 1012 may be the uppermost block among left blocks adjacent to the left boundary of the current block 1000 and the upper neighboring block 1013 may be the leftmost block among upper blocks adjacent to the upper boundary of the current block 1000. Various availability check orders for the candidate blocks may be applied. For example, availability check may be performed in the order of the upper left neighboring block 1011, the left neighboring block 1012 and the upper neighboring block 1013 or in the order of the left neighboring block 1012, the upper left neighboring block 1011 and the upper neighboring block 1013.

In addition, neighboring candidate blocks for CP1 of the current block 1000 may include an upper right neighboring block 1021 and an upper neighboring block 1022 of the current block 1000. Here, the upper neighboring block 1022 may be the uppermost block among upper blocks adjacent to the upper boundary of the current block 1000. Various availability check orders for the candidate blocks may be applied. For example, availability check may be performed in the order of the upper right neighboring block 1021 and the upper neighboring block 1022 or in the order of the upper neighboring block 1022 and the upper right neighboring block 1021.

Furthermore, neighboring candidate blocks for CP2 of the current block 1000 may include a lower left neighboring block 1031 and a left neighboring block 1032 of the current block 1000. Here, the left neighboring block 1032 may be the lowest block among left blocks adjacent to the left boundary of the current block 1000. Various availability check orders for the candidate blocks may be applied. For example, availability check may be performed in the order of the lower left neighboring block 1031 and the left neighboring block 1032 or in the order of the left neighboring block 1032 and the lower left neighboring block 1031.

Further, availability check for determining whether neighboring candidate blocks are valid may be performed based on at least one of the following conditions.

Availability check is applied when a neighboring candidate block is present. For example, the neighboring candidate block needs to be present in a picture and/or a slice and needs to be a block which can be referred to in coding order. For example, cases in which the neighboring candidate block is not available may include a case in which the corresponding neighboring block is positioned outside the current picture (e.g., it may be determined that an upper lift neighboring block or a lower left neighboring block of the current block is not available when the current block is positioned adjacent to the left boundary of the current picture), a case in which the corresponding neighboring block is positioned in a slice or a tile different from the current block, and the like. Here, a slice may be a sequence of an integer number of CTUs. The CTUs in the slice may be included in an independent slice segment and subsequent dependent slice segments. A tile is a rectangular region including CTUs (CTBs). The rectangular region may be divided based on a specific tile column and a specific tile row in a picture.

Availability check is applied when a candidate block is in the inter-mode. For example, the transformation prediction model may not be applied to the current block if any one of neighboring candidate blocks of three control points of the current block has been coded into the intra-prediction mode. This is because it is difficult to determine motion tendency of an image with respect to the current block when any one of the neighboring candidate blocks has been coded into the intra-prediction mode. When one of candidate blocks is in the intra-mode and the remaining candidate blocks are candidate blocks for CPs disposed on a straight line as another example, a transformation prediction model limited to only two control points may be applied. In this case, Equation 3 may be applied as described above.

Availability check may be applied when the transformation prediction mode is applied to any one of neighboring candidate blocks. When a neighboring candidate block has been coded into the transformation prediction mode, block transformation information of the current block and block transformation information of the neighboring candidate block may be similar and thus there is a high possibility that the block transformation information becomes an MVP suitable to derive motion vectors of control points.

Availability check may be applied when neighboring candidate blocks have the same inter-prediction direction. This is because motion vectors of neighboring candidate blocks having different prediction directions have relatively low accuracy in prediction of a degree of transformation of the current block.

Meanwhile, a reference picture index for the current block may be explicitly signaled from an encoding device or may be derived based on neighboring candidate blocks. When available candidate blocks use the same reference picture index, the reference picture index may be used as a reference picture index for the current block. When available candidate blocks have different reference picture indexes, if transformation information about the current block is predicted from motion vectors for different reference pictures, prediction accuracy may be low. Accordingly, the same reference picture index needs to be used. When candidate blocks have different reference picture indexes, the reference picture index for the current block may be derived based on one of the following methods.

The reference picture index for the current block is fixed to 0.

A minimum value among reference picture indexes in the same reference picture list of neighboring candidate blocks is used.

A mode among reference picture indexes in the same reference picture list of neighboring candidate blocks is used.

In this case, a motion vector of a candidate block may be scaled in consideration of a POC distance and used according to a derived reference picture index. Here, the motion vector of the candidate block may be scaled based on a POC difference between the current picture and a reference picture of the candidate block and a POC difference between the current picture and a reference picture (indicated by the reference picture index) of the current block.

According to the above-described method, (transformation prediction) motion vectors of control points of the current block can be obtained based on neighboring candidate blocks, and (transformation prediction) motion vectors of sub-blocks or sample points of the current block can be efficiently derived based on the motion vectors of the control points. A decoding device can derive a reference region in a reference picture indicated by a reference picture index for the current block based on motion vectors of the current block and generate prediction samples and reconstructed samples for the current block based on reconstructed samples in the reference region.

Figure 11:
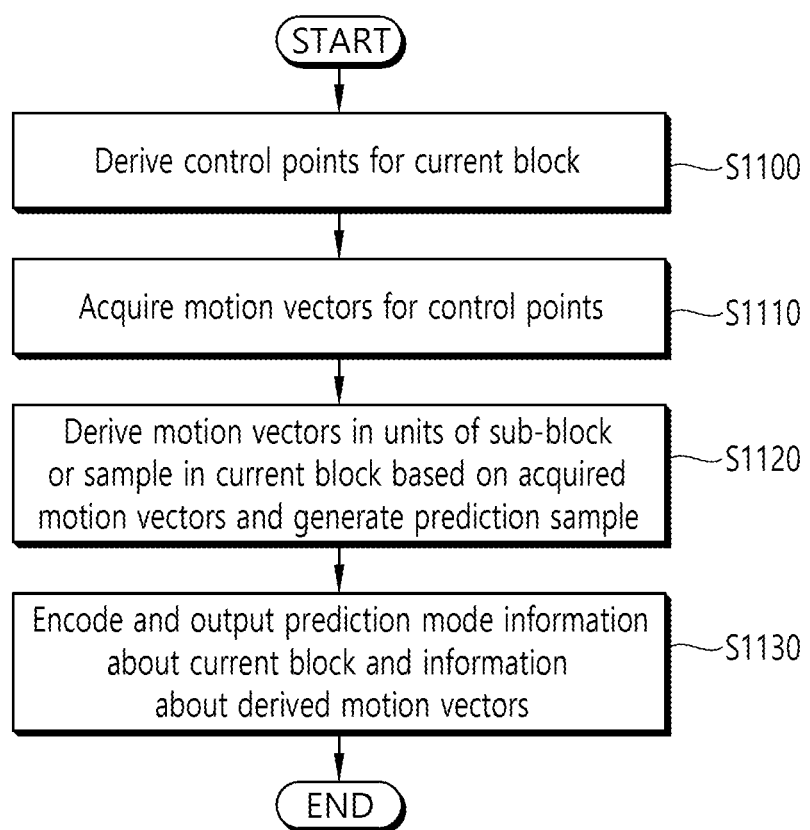
FIG. 11 schematically shows an example of a video encoding method according to the present invention.

FIG. 11 schematically shows an example of a video encoding method according to the present invention. The method shown in FIG. 11 may be performed by an encoding device.

Referring to FIG. 11, the encoding device derives control points CPs with respect to a current block (S1100). Two or three CPs may be used.

For example, the number of CPs may be 2. In this case, the coordinates of CP0 among the CPs may be (0, 0) and the coordinates of CP1 may be (S, 0) when the coordinates of the top-left sample position of the current block are (0, 0) and the height and the width of the current block are S.

Alternatively, the number of CPs may be 3. In this case, the coordinates of CP0 among the CPs may be (0, 0), the coordinates of CP1 may be (S, 0) and the coordinates of CP2 may be (0, S) when the coordinates of the top-left sample position of the current block are (0, 0) and the height and the width of the current block are S. When the height of the current block is S and the width thereof is W, the coordinates of CP0 among the CPs may be (0, 0), the coordinates of CP1 may be (W, 0) and the coordinates of CP2 may be (0, H).

The encoding device acquires motion vectors for the CPs (S1110). For example, the encoding device may acquire the motion vectors for the CPs based on neighboring candidate blocks according to a predefined method. That is, the motion vectors for the CPs may be derived based on motion vectors of neighboring blocks of the current block. In this case, the motion vectors of the CPs may be acquired based on motion vectors of neighboring blocks adjacent to the CPs.

Alternatively, the encoding device may detect optimum motion vectors for the CPs according to motion estimation.

The encoding device derives motion vectors in units of a sub-block or a sample in the current block based on the acquired motion vectors (S1120). The encoding device may derive motion vectors in units of a sub-block or a sample in the current block according to the transformation prediction model of the present invention and perform more accurate inter-prediction through the motion vectors.

For example, when the number of CPs is 2, the motion vectors in units of a sub-block or a sample in the current block may be derived based on the aforementioned equation 3. In this case, $v_x$ and $v_y$ may be calculated based on the aforementioned equation 3. Here, $v_x$ and $v_y$ represent x and y components of a motion vector for coordinates (x, y) in the current block, as described above.

Alternatively, when the number of CPs is 3, the motion vectors in units of a sub-block or a sample in the current block may be derived based on the aforementioned equation 2.

The sub-blocks may have a uniform size. That is, the sub-blocks may have a size of n×n.

Here, n may be a positive integer or a power of 2. For example, n may be 4.

When motion vectors are derived in units of the sub-block, a motion vector corresponding to the coordinates of the top-left sample position of a sub-block may be used as a motion vector for the sub-block. As another example, a motion vector corresponding to the coordinates of a center lower right side sample position of a sub-block may be used as a motion vector for the sub-block. Here, the center lower right side sample position may refer to the position of a lower right sample among four samples positioned at the center of the sub-block.

The encoding device generates a prediction sample for the current block based on the derived motion vectors (S1130). If the prediction mode for the current block is not the skip mode, the encoding device may generate a residual sample (or residual signal) based on the original sample of the original picture and the prediction sample.

The encoding device encodes information about the prediction mode for the current block and the derived motion vectors and outputs the encoded information (S1140). The encoding device may encode the information about the prediction mode for the current block and the derived motion vectors and output the encoded information in the form of a bitstream. The bitstream may be transmitted to a decoding device through a network or a storage medium.

Figure 12:
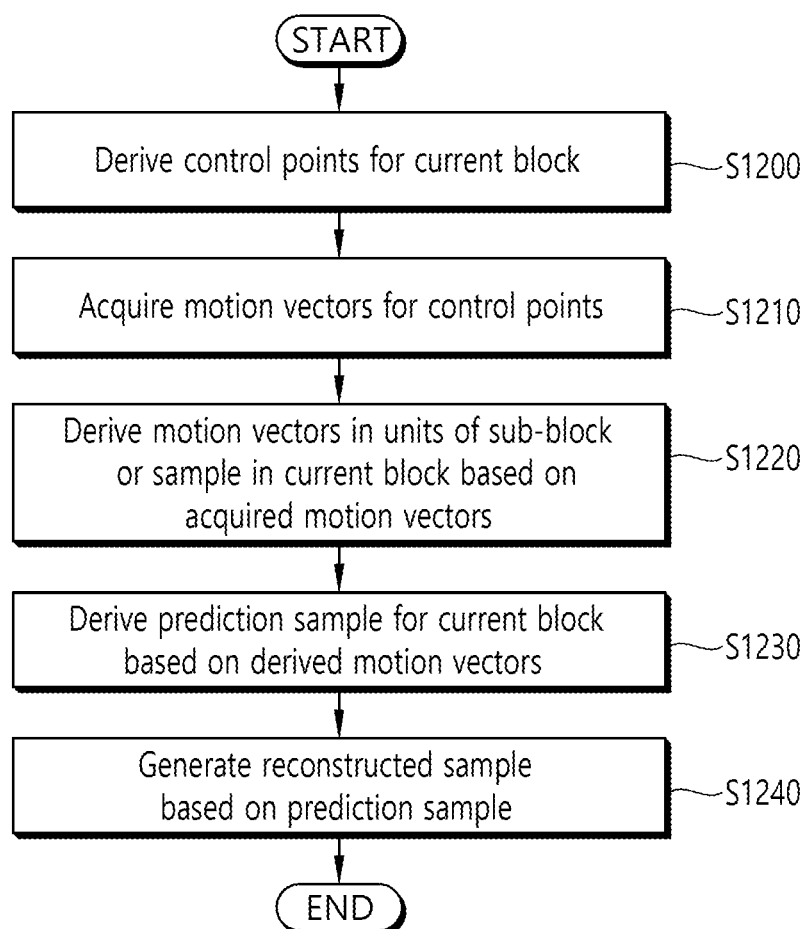
FIG. 12 schematically shows an example of a video decoding method according to the present invention.

Although not shown, the decoding device may encode information about the residual sample for the current block and output the encoded information. The information about the residual sample may include transform coefficients with respect to the residual sample. FIG. 12 schematically shows an example of a video decoding method according to the present invention. The method shown in FIG. 12 may be performed by a decoding device.

Referring to FIG. 12, the decoding device derives control points CPs for the current block (S1200). Two or three CPs may be used.

For example, the number of CPs may be 2. In this case, the coordinates of CP0 among the CPs may be (0, 0) and the coordinates of CP1 may be (S, 0) when the coordinates of the top-left sample position of the current block are (0, 0) and the height and the width of the current block are S.

Alternatively, the number of CPs may be 3. In this case, the coordinates of CP0 among the CPs may be (0, 0), the coordinates of CP1 may be (S, 0) and the coordinates of CP2 may be (0, 5) when the coordinates of the top-left sample position of the current block are (0, 0) and the height and the width of the current block are S. When the height of the current block is S and the width thereof is W, the coordinates of CP0 among the CPs may be (0, 0), the coordinates of CP1 may be (W, 0) and the coordinates of CP2 may be (0, H).

The decoding device derives and acquires motion vectors for the CPs (S1210).

The motion vectors for the CPs may be derived based on motion vectors of neighboring blocks of the current block. In this case, the motion vectors of the CPs may be acquired based on motion vectors of neighboring blocks adjacent to the CPs.

For example, the decoding device may derive neighboring candidate blocks for the current block. In this case, the neighboring candidate blocks may include an upper left neighboring block, an upper right neighboring block and a lower left neighboring block.

For example, the motion vector of CP0 may be acquired based on the upper left neighboring block, the motion vector of CP1 may be acquired based on the upper right neighboring block, and the motion vector of CP2 may be acquired based on the lower left neighboring block.

Alternatively, the coordinates of the top-left sample position or a center lower right sample position of the upper left neighboring block may be reset to (0, 0) as described above with reference to FIG. 9, and the motion vectors for the CPs may be acquired based on the reset coordinates and the motion vectors of the neighboring candidate blocks.

Alternatively, the decoding device may derive motion vector 0 for CP0 based on neighboring block group 0 including an upper left neighboring block, a first left neighboring block and a first upper neighboring block, derive motion vector 1 for CP1 based on neighboring block group 1 including an upper right neighboring block and a second upper neighboring block, and derive motion vector 2 for CP2 based on neighboring block group 2 including a lower left neighboring block and a second left neighboring block. Here, the first left neighboring block may be the uppermost block among left neighboring blocks adjacent to the left boundary of the current block, the first upper neighboring block may be the leftmost block among upper neighboring blocks adjacent to the upper boundary of the current block, the second upper neighboring block may be the rightmost block among upper neighboring blocks adjacent to the upper boundary of the current block, and the second left neighboring block may be the uppermost block among left neighboring blocks adjacent to the left boundary of the current block.

In this case, the decoding device may sequentially determine availability based on predefined priority of candidate blocks and derive a motion vector of a corresponding CP based on a motion vector of an available candidate block. For example, the decoding device may sequentially determine availability for the upper left neighboring block, the first left neighboring block and the first upper neighboring block according to a predefined first priority, sequentially determine availability for the upper right neighboring block and the second upper neighboring block according to a predefined second priority, and sequentially determine availability for the lower left neighboring block and the second left neighboring block according to a predefined third priority.

The decoding device derives motion vectors in units of a sub-block or a sample in the current block based on the acquired motion vectors (S1220).

The decoding device may derive motion vectors in units of a sub-block or a sample in the current block according to the transformation prediction model of the present invention and perform more accurate inter-prediction through the motion vectors.

For example, when the number of CPs is 2, the motion vectors in units of a sub-block or a sample in the current block may be derived based on the aforementioned equation 3. In this case, $v_x$ and $v_y$ may be calculated based on the aforementioned equation 3. Here, $v_x$ and $v_y$ represent x and y components of a motion vector for coordinates (x, y) in the current block, as described above.

Alternatively, when the number of CPs is 3, the motion vectors in units of a sub-block or a sample in the current block may be derived based on the aforementioned equation 2.

The sub-block may have a uniform size. That is, the sub-block may have a size of n×n. Here, n may be a positive integer or a power of 2. For example, n may be 4.

When motion vectors are derived in units of the sub-block, a motion vector corresponding to the coordinates of the top-left sample position of a sub-block may be used as a motion vector for the sub-block. As another example, a motion vector corresponding to the coordinates of a center lower right side sample position of a sub-block may be used as a motion vector for the sub-block. Here, the center lower right side sample position may refer to the position of a lower right sample among four samples positioned at the center of the sub-block.

The decoding device derives a prediction sample (or a prediction sample array) for the current block based on the derived motion vectors (S1230). In this case, the decoding device may derive a reference picture based on a reference picture index of the current block, derive a reference region indicated by a motion vector in units of a sample or a sub-block in the reference picture, and use a reconstructed sample in the reference region as a prediction sample for the current block. The reference picture index of the current block may be fixed to 0 or may be derived based on reference picture indexes of neighboring blocks of the current block.

Alternatively, a minimum value or a mode among reference picture indexes in the same reference picture list of neighboring candidate blocks may be used as the reference picture index of the current block.

The decoding device generates a reconstructed sample based on the prediction sample (S1240). The decoding device may use the prediction sample as a reconstructed sample or add a residual sample to the prediction sample to generate a reconstructed sample according to prediction mode.

Although not shown, the decoding device may receive and parse prediction mode information about the current block and information about the motion vectors of the CPs from a bitstream. The prediction mode information may indicate the prediction mode with respect to the current block. For example, the prediction mode may represent whether the skip mode, the merge mode or the AVMP mode is applied to the current block or represent whether the transformation prediction model (mode) is applied to the current block. The information about the motion vectors of the CPs is information for indicating the motion vectors of the CPs and may indicate a neighboring block to be used among neighboring blocks of the current block or indicate a method used to derive the motion vectors of the CPs.

In addition, the decoding device may receive information about a residual sample for the current block from the bitstream when a residual signal for the current block is present. The information about the residual sample may include transform coefficients with respect to the residual sample. The decoding device may derive the residual sample (or residual sample array) for the current block based on the information about the residual sample. The decoding device may generate a reconstructed sample based on the prediction sample and the residual sample and derive a reconstructed block or a reconstructed picture based on the reconstructed sample.

Figure 13:
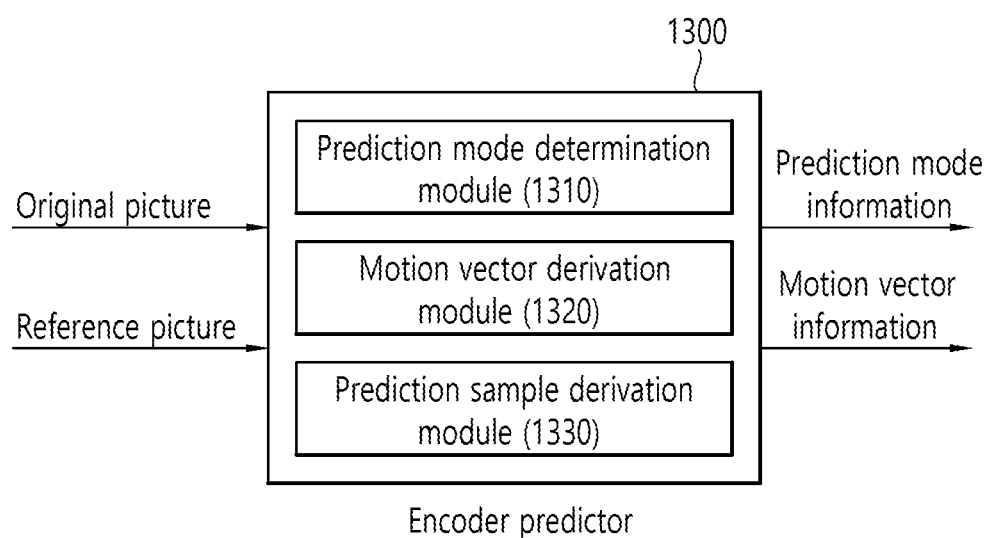
FIG. 13 is a block diagram schematically showing a predictor included in an encoding apparatus according to the present invention.

FIG. 13 is a block diagram schematically showing a predictor included in an encoding apparatus according to the present invention.

Referring to FIG. 13, the predictor 1300 included in the encoding apparatus according to the present invention may include a prediction mode determination module 1310, a motion vector derivation module 1320 and a prediction sample derivation module 1330.

The prediction mode determination module 1310 may determine an inter-prediction mode for the current block. For example, the prediction mode determination module 1310 may determine whether the merge mode or the AMVP mode is applied to the current block and determine whether the above-described transformation prediction mode is applied. The prediction mode determination module 1310 may determine an optimum prediction mode based on RD costs according to various prediction modes.

The motion vector derivation module 1320 derives at least one motion vector for the current block. The motion vector derivation module 1330 may detect a reference region in a reference picture through motion estimation. Alternatively, the motion vector derivation module 1320 may derive an optimum motion vector candidate among limited motion vector candidates according to a determined algorithm.

The motion vector derivation module 1320 may derive control points CPs for the current block when the transformation prediction mode is applied to the current block. In this case, two or three CPs may be used. That is, the motion vector derivation module 1320 may determine the number of CPs used for the current block.

For example, when two CPs are used, the coordinates of CP0 among the CPs may be (0, 0) and the coordinates of CP1 may be (S, 0) if the coordinates of the top-left sample position of the current block are (0, 0) and the height and the width of the current block are S.

As another example, when three CPs are used, the coordinates of CP0 among the CPs may be (0, 0), the coordinates of CP1 may be (S, 0) and the coordinates of CP2 may be (0, S) if the coordinates of the top-left sample position of the current block are (0, 0) and the height and the width of the current block are S. If the height of the current block is H and the width thereof is W, the coordinates of CP0 among the CPs may be (0, 0), the coordinates of CP1 may be (W, 0) and the coordinates of CP2 may be (0, H).

The motion vector derivation module 1320 may derive and acquire motion vectors for the CPs. The motion vector derivation module 1320 may derive the motion vectors for the CPs based on the motion vector of the current block. In this case, the motion vector derivation module 1320 may acquire a motion vector for a corresponding CP based on a motion vector of a neighboring block adjacent to each CP.

For example, the motion vector derivation module 1320 may derive neighboring candidate blocks for the current block. In this case, the neighboring candidate blocks may include an upper left neighboring block, an upper right neighboring block and a lower left neighboring block.

For example, a motion vector of CP0 may be acquired based on the upper left neighboring block, a motion vector of CP1 may be acquired based on the upper right neighboring block, and a motion vector of CP2 may be acquired based on the lower left neighboring block.

Alternatively, the coordinates of the top-left sample position or a center lower right sample position of the upper left neighboring block may be reset to (0, 0) as described above with reference to FIG. 9, and the motion vectors for the CPs may be acquired based on the reset coordinates and the motion vectors of the neighboring candidate blocks.

Alternatively, the motion vector derivation module 1320 may derive motion vector 0 for CP0 based on neighboring block group 0 including an upper left neighboring block, a first left neighboring block and a first upper neighboring block, derive motion vector 1 for CP1 based on neighboring block group 1 including an upper right neighboring block and a second upper neighboring block, and derive motion vector 2 for CP2 based on neighboring block group 2 including a lower left neighboring block and a second left neighboring block. Here, the first left neighboring block may be the uppermost block among left neighboring blocks adjacent to the left boundary of the current block, the first upper neighboring block may be the leftmost block among upper neighboring blocks adjacent to the upper boundary of the current block, the second upper neighboring block may be the rightmost block among upper neighboring blocks adjacent to the upper boundary of the current block, and the second left neighboring block may be the uppermost block among left neighboring blocks adjacent to the left boundary of the current block.

In this case, the motion vector derivation module 1320 may sequentially determine availability based on predefined priority of candidate blocks and derive a motion vector of a corresponding CP based on a motion vector of an available candidate block. For example, the motion vector derivation module 1320 may sequentially determine availability for the upper left neighboring block, the first left neighboring block and the first upper neighboring block according to a predefined first priority, sequentially determine availability for the upper right neighboring block and the second upper neighboring block according to a predefined second priority, and sequentially determine availability for the lower left neighboring block and the second left neighboring block according to a predefined third priority.

The motion vector derivation module 1320 derives motion vectors in units of a sub-block or a sample in the current block based on the motion vectors for the CPs. The motion vector derivation module 1320 may derive motion vectors in units of a sub-block or a sample in the current block according to the transformation prediction model of the present invention and perform more accurate inter-prediction through the motion vectors.

For example, when the number of CPs is 2, the motion vector derivation module 1320 may derive motion vectors in units of a sub-block or a sample in the current block based on the aforementioned equation 3. In this case, $v_x$ and $v_y$ may be calculated based on the aforementioned equation 3. Here, $v_x$ and $v_y$ represent x and y components of a motion vector for coordinates (x, y) in the current block, as described above.

Alternatively, when the number of CPs is 3, the motion vector derivation module 1320 may derive the motion vectors in units of a sub-block or a sample in the current block based on the aforementioned equation 2.

The prediction sample derivation module 1330 derives a prediction sample (or prediction sample array) for the current block based on the derived motion vectors in units of a sub-block or a sample.

In this case, the prediction sample derivation module 1330 may derive a reference region indicated by a motion vector in units of a sample or a sub-block in a reference picture, and use a reconstructed sample in the reference region as a prediction sample for the current block. In this case, at least one of reference picture list 0 (L0) and reference picture list 1 (L1) may be used.

Figure 14:
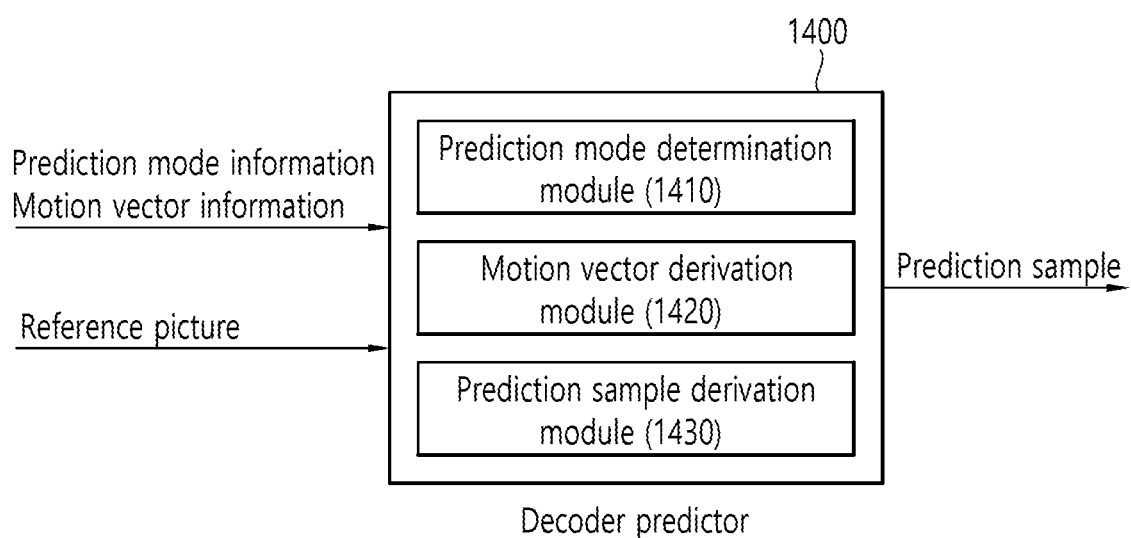
FIG. 14 is a block diagram schematically showing a predictor included in a decoding apparatus according to the present invention.

FIG. 14 is a block diagram schematically showing a predictor included in the decoding apparatus according to the present invention.

Referring to FIG. 14, the predictor 1400 included in the decoding apparatus according to the present invention may include a prediction mode determination module 1410, a motion vector derivation module 1420 and a prediction sample derivation module 1430.

The prediction mode determination module 1410 may determine a prediction mode for the current block. For example, the prediction mode determination module 1410 may determine whether the merge mode or the AMVP mode is applied to the current block and determine whether the above-described transformation prediction mode is applied. The prediction mode determination module 1410 may determine a prediction mode applied to the current block based on a predetermined criterion or mode information acquired from a bitstream through a decoding unit.

The motion vector derivation module 1420 derives at least one motion vector for the current block.

The motion vector derivation module 1420 may derive control points CPs for the current block when the transformation prediction mode is applied to the current block. In this case, two or three CPs may be used. That is, the motion vector derivation module 1420 may determine the number of CPs used for the current block.

For example, when two CPs are used, the coordinates of CP0 among the CPs may be (0, 0) and the coordinates of CP1 may be (S, 0) if the coordinates of the top-left sample position of the current block are (0, 0) and the height and the width of the current block are S.

As another example, when three CPs are used, the coordinates of CP0 among the CPs may be (0, 0), the coordinates of CP1 may be (S, 0) and the coordinates of CP2 may be (0, S) if the coordinates of the top-left sample position of the current block are (0, 0) and the height and the width of the current block are S. If the height of the current block is H and the width thereof is W, the coordinates of CP0 among the CPs may be (0, 0), the coordinates of CP1 may be (W, 0) and the coordinates of CP2 may be (0, H).

The motion vector derivation module 1420 may derive and acquire motion vectors for the CPs. The motion vector derivation module 1420 may derive the motion vectors for the CPs based on the motion vector of the current block. In this case, the motion vector derivation module 1420 may acquire a motion vector for a corresponding CP based on a motion vector of a neighboring block adjacent to each CP.

For example, the motion vector derivation module 1420 may derive neighboring candidate blocks for the current block. In this case, the neighboring candidate blocks may include an upper left neighboring block, an upper right neighboring block and a lower left neighboring block.

For example, a motion vector of CP0 may be acquired based on the upper left neighboring block, a motion vector of CP1 may be acquired based on the upper right neighboring block, and a motion vector of CP2 may be acquired based on the lower left neighboring block.

Alternatively, the coordinates of the top-left sample position or a center lower right sample position of the upper left neighboring block may be reset to (0, 0) as described above with reference to FIG. 9, and the motion vectors for the CPs may be acquired based on the reset coordinates and the motion vectors of the neighboring candidate blocks.

Alternatively, the motion vector derivation module 1420 may derive motion vector 0 for CP0 based on neighboring block group 0 including an upper left neighboring block, a first left neighboring block and a first upper neighboring block, derive motion vector 1 for CP1 based on neighboring block group 1 including an upper right neighboring block and a second upper neighboring block, and derive motion vector 2 for CP2 based on neighboring block group 2 including a lower left neighboring block and a second left neighboring block. Here, the first left neighboring block may be the uppermost block among left neighboring blocks adjacent to the left boundary of the current block, the first upper neighboring block may be the leftmost block among upper neighboring blocks adjacent to the upper boundary of the current block, the second upper neighboring block may be the rightmost block among upper neighboring blocks adjacent to the upper boundary of the current block, and the second left neighboring block may be the uppermost block among left neighboring blocks adjacent to the left boundary of the current block.

In this case, the motion vector derivation module 1420 may sequentially determine availability based on predefined priority of candidate blocks and derive a motion vector of a corresponding CP based on a motion vector of an available candidate block. For example, the motion vector derivation module 1420 may sequentially determine availability for the upper left neighboring block, the first left neighboring block and the first upper neighboring block according to a predefined first priority, sequentially determine availability for the upper right neighboring block and the second upper neighboring block according to a predefined second priority, and sequentially determine availability for the lower left neighboring block and the second left neighboring block according to a predefined third priority.

The motion vector derivation module 1420 derives motion vectors in units of a sub-block or a sample in the current block based on the motion vectors for the CPs. The motion vector derivation module 1420 may derive motion vectors in units of a sub-block or a sample in the current block according to the transformation prediction model of the present invention and perform more accurate inter-prediction through the motion vectors.

For example, when the number of CPs is 2, the motion vector derivation module 1420 may derive motion vectors in units of a sub-block or a sample in the current block based on the aforementioned equation 3. In this case, $v_x$ and $v_y$ may be calculated based on the aforementioned equation 3. Here, $v_x$ and $v_y$ represent x and y components of a motion vector for coordinates (x, y) in the current block, as described above.

Alternatively, when the number of CPs is 3, the motion vector derivation module 1420 may derive the motion vectors in units of a sub-block or a sample in the current block based on the aforementioned equation 2.

The prediction sample derivation module 1430 derives a prediction sample (or prediction sample array) for the current block based on the derived motion vectors in units of a sub-block or a sample.

In this case, the prediction sample derivation module 1430 may derive a reference picture based on a reference picture index of the current block, derive a reference region indicated by a motion vector in units of a sample or a sub-block in the reference picture, and use a reconstructed sample in the reference region as a prediction sample for the current block. In this case, at least one of reference picture list 0 (L0) and reference picture list 1 (L1) may be used. The reference picture index of the current block for L0 or L1 may be fixed to 0 or may be derived based on reference picture indexes of neighboring blocks of the current block. Alternatively, a minimum value or a mode among reference picture indexes in the same reference picture list of neighboring candidate blocks may be used as the reference picture index of the current block.

According to the above-described present invention, it is possible to derive more accurate motion vectors for the current block and considerably increase inter-prediction efficiency.

In addition, according to the present invention, it is possible to efficiently derive (transformation prediction) motion vectors for sub-blocks or sample points of the current block based on (transformation prediction) motion vectors of control points of the current block.

Furthermore, according to the present invention, it is possible to effectively perform inter-prediction through (transformation prediction) motion vectors not only when an image in the current block is moved in a plane but also when the image is rotated, zoomed in, zoomed out or transformed into a parallelogram. Accordingly, the amount of data for a residual signal for the current block can be eliminated and the overall coding efficiency can be improved.

The above-described methods according to the present invention may be realized in the form of software, and the encoding device and/or the decoding device according to the present invention may be included in image processing apparatuses such as a TV, a computer, a smartphone, a set-top box and a display device, for example.

The above description is only illustrative of the technical idea of the present invention. Therefore, those skilled in the art may make various modifications and variations to the above description without departing from the essential characteristics of the present invention. Accordingly, the embodiments disclosed herein are intended to be illustrative, not limiting, of the present invention. The scope of the present invention is not limited by these embodiments. The scope of protection of the present invention should be construed according to the following claims.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A video decoding method performed by a decoding apparatus, the method comprising:
   deriving control points (CPs) for a current block;
   acquiring motion vectors for the CPs;
   deriving motion vectors of sub-blocks in the current block based on the acquired motion vectors;
   deriving a prediction sample for the current block based on the derived motion vectors; and
   generating a reconstructed sample based on the prediction sample,
   wherein, based on a number of CPs being 2, coordinates of a top-left sample position of the current block being (0, 0), and a height and a width of the current block being S, coordinates of CP0 among the CPs are (0, 0) and coordinates of CP1 are (S, 0).

2. The video decoding method of claim 1, wherein the motion vectors in units of a sub-block or a sample in the current block are derived based on the following equation E1, $$v_x = \frac{v_{x1} - v_{x0}}{S}x - \frac{v_{y1} - v_{y0}}{S}y + v_{x0} \quad \text{(E1)}$$
$$v_y = \frac{v_{y1} - v_{y0}}{S}x + \frac{v_{x1} - v_{x0}}{S}y + v_{y0}$$

wherein $v_x$ and $v_y$ represent an x-component and a y-component of a motion vector with respect to coordinates (x, y) in the current block, $v_{x0}$ and $v_{y0}$ represent an x-component and a y-component of a motion vector of CP0, and $v_{x1}$ and $v_{y1}$ represent an x-component and a y-component of a motion vector of CP1.

3. The video decoding method of claim 1, wherein the sub-block has a size of n×n and n is a positive integer.

4. The video decoding method of claim 3, wherein n is 4.

5. The video decoding method of claim 3, wherein a motion vector corresponding to a top-left sample position of the sub-block is used as a motion vector for the sub-block.

6. The video decoding method of claim 3, wherein a motion vector corresponding to a lower right sample position of the center of the sub-block is used as a motion vector for the sub-block.

7. The video decoding method of claim 1, wherein, based on the number of CPs being 3, the coordinates of the top-left sample position of the current block being (0, 0), and the height and the width of the current block being S, coordinates of CP0 among the CPs are (0, 0), the coordinates of CP1 are (S, 0), and coordinates of CP2 are (0, S).

8. The video decoding method of claim 7, wherein the motion vectors in units of a sub-block or a sample in the current block are derived based on the following equation E2, $$v_x = \frac{v_{x1} - v_{x0}}{S}x + \frac{v_{x2} - v_{x0}}{S}y + v_{x0} \quad \text{(E2)}$$
$$v_y = \frac{v_{y1} - v_{y0}}{S}x + \frac{v_{y2} - v_{y0}}{S}y + v_{y0}$$

wherein $v_x$ and $v_y$ represent an x-component and a y-component of a motion vector with respect to coordinates (x, y) in the current block, $v_{x0}$ and $v_{y0}$ represent an x-component and a y-component of a motion vector of CP0, $v_{x1}$ and $v_{y1}$ represent an x-component and a y-component of a motion vector of CP1, and $v_{x2}$ and $v_{y2}$ represent an x-component and a y-component of a motion vector of CP2.

9. The video decoding method of claim 7, wherein the acquiring of the motion vectors for the CPs comprises:
deriving motion vector 0 for CP0 based on neighboring block group 0 including an upper left neighboring block, a first left neighboring block and a first upper neighboring block;
deriving motion vector 1 for CP1 based on neighboring block group 1 including an upper right neighboring block and a second upper neighboring block; and
deriving motion vector 2 for CP2 based on neighboring block group 2 including a lower left neighboring block and a second left neighboring block,
wherein it is sequentially determined whether the upper left neighboring block, the first left neighboring block and the first upper neighboring block are available according to a predefined first priority, it is sequentially determined whether the upper right neighboring block and the second upper neighboring block are available according to a predefined second priority, and it is sequentially determined whether the lower left neighboring block and the second left neighboring block are available according to a predefined third priority.

10. The video decoding method of claim 9, wherein the first left neighboring block is the uppermost block among left neighboring blocks adjacent to the left boundary of the current block, the first upper neighboring block is the leftmost block among upper neighboring blocks adjacent to the upper boundary of the current block, the second upper neighboring block is the rightmost block among upper neighboring blocks adjacent to the upper boundary of the current block, and the second left neighboring block is the uppermost block among the left neighboring blocks adjacent to the left boundary of the current block.

11. The video decoding method of claim 1, wherein motion vectors for the CPs are acquired based on motion vectors of neighboring blocks of the current block.

12. The video decoding method of claim 1, further comprising deriving neighboring candidate blocks for the current block,
wherein the neighboring candidate blocks include an upper left neighboring block, an upper right neighboring block and a lower left neighboring block, the coordinates of a top-left sample position or a central lower right sample position of the upper left neighboring block are reset to (0, 0), and motion vectors for the CPs are acquired based on the reset coordinates and motion vectors of the neighboring candidate blocks.

13. The video decoding method of claim 1, wherein the prediction sample for the current block is derived based on the derived motion vectors and a reference picture index of the current block, and the reference picture index of the current block is derived based on a reference picture index of a neighboring block of the current block.

14. A video encoding method performed by an encoding apparatus, comprising:
deriving control points (CPs) for a current block;
acquiring motion vectors for the CPs;
deriving motion vectors of sub-blocks in the current block based on the acquired motion vectors;
generating a prediction sample for the current block based on the derived motion vectors; and
encoding prediction mode information about the current block and information about the derived motion vector and outputting the encoded information,
wherein, based on a number of CPs being 2, coordinates of a top-left sample position of the current block being (0, 0), and a height and a width of the current block being S, coordinates of CP0 among the CPs are (0, 0) and coordinates of CP1 are (S, 0).

15. A non-transitory decoder-readable storage medium storing a bitstream generated by deriving control points (CPs) for a current block, acquiring motion vectors for the CPs, deriving motion vectors of sub-blocks in the current block based on the acquired motion vectors, generating a prediction sample for the current block based on the derived motion vectors, and encoding prediction mode information about the current block and information about the derived motion vector and outputting the encoded information, wherein, based on a number of CPs being 2, coordinates of a top-left sample position of the current block being (0, 0), and a height and a width of the current block being S, coordinates of CP0 among the CPs are (0, 0) and coordinates of CP1 are (S, 0).

* * * * *